(12) United States Patent
Nagaoka

(10) Patent No.: US 6,488,842 B2
(45) Date of Patent: *Dec. 3, 2002

(54) FILTERING DEVICE

(76) Inventor: Tadayoshi Nagaoka, 573-2, Oaza Ureshi, Tondabayashi-shi, Osaka-fu (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/259,494

(22) Filed: Feb. 26, 1999

(65) Prior Publication Data

US 2001/0022287 A1 Sep. 20, 2001

(51) Int. Cl.[7] .......................... B01D 21/34; B01D 24/16; B01D 24/46; B01D 33/50
(52) U.S. Cl. .................. 210/136; 210/275; 210/284; 210/289; 210/291; 210/323.2; 210/315; 210/317; 210/333.01; 210/335; 210/338; 210/355; 210/411; 210/415; 210/458; 210/489; 210/499
(58) Field of Search ............................ 210/323.2, 338, 210/317, 314–315, 342, 388, 393, 499, 321.64, 321.67, 263–264, 266, 275, 276, 280, 283–284, 289, 290, 333.01, 335–337, 319, 320, 407–409, 411, 413, 414, 416.1, 301, 306, 382, 355, 323.1, 322; 55/441, 482, 512, 515, 519; 96/132–133, 136; 209/332

(56) References Cited

U.S. PATENT DOCUMENTS

| | | | | |
|---|---|---|---|---|
| 53,584 A | * | 4/1866 | Dewey et al. | |
| 143,676 A | * | 10/1873 | Demailly | |
| 231,066 A | * | 8/1880 | Long | |
| 585,497 A | * | 6/1897 | Aufrichtig | |
| 869,558 A | * | 10/1907 | Durbrow | |
| 1,624,832 A | * | 4/1927 | Glover | |
| 2,507,125 A | * | 5/1950 | Townsend | |
| 3,312,349 A | * | 4/1967 | Rosaen | |
| 3,481,474 A | * | 12/1969 | Paulson | 210/304 |
| 4,021,339 A | | 5/1977 | Foody | |
| 4,413,426 A | * | 11/1983 | Graff | 34/473 |
| 4,578,248 A | | 3/1986 | Nagaoka | |
| 4,788,819 A | * | 12/1988 | Henkel | 60/303 |
| 4,874,533 A | * | 10/1989 | Boze et al. | 210/778 |
| 5,089,131 A | * | 2/1992 | Gentry | 210/253 |
| 5,275,728 A | * | 1/1994 | Koller | 210/391 |
| 5,290,457 A | | 3/1994 | Karbachsch et al. | |
| 5,622,625 A | * | 4/1997 | Nagaoka | 210/232 |
| 5,632,903 A | * | 5/1997 | Carracciolo, Jr. | 210/741 |
| 6,017,451 A | * | 1/2000 | Kopf | 210/232 |
| 6,070,739 A | * | 6/2000 | Nagaoka | 210/407 |
| 6,200,467 B1 | * | 3/2001 | Nagaoka | 210/136 |

FOREIGN PATENT DOCUMENTS

| | | |
|---|---|---|
| EP | 0 947 230 | 10/1999 |
| EP | 0 955 079 | 11/1999 |
| GB | 227 707 | 1/1925 |

OTHER PUBLICATIONS

Patent Abstract of 09024216 (Nagaoka, "Filter Apparatus" pub. Jan. 1997; p. 1).

* cited by examiner

Primary Examiner—Matthew O. Savage
Assistant Examiner—Marianne Ocampo
(74) Attorney, Agent, or Firm—Hedman & Costigan, P.C.

(57) ABSTRACT

A filtering device includes a container having an inlet for introducing liquid to be treated, an annular multi-layered prepacked screen assembly provided in the container and having an outlet for treated liquid. The screen assembly includes three or more cylindrical screens having different diameters and being coaxially disposed in the container with their axes extending vertically in the container. An annulus is formed between the respective cylindrical screens. Two or more different filter materials performing different filtering functions are filled one in each of the annuluses between the cylindrical screens.

8 Claims, 16 Drawing Sheets

FILTERING DEVICE

BACKGROUND OF THE INVENTION

This invention relates to a filtering device and, more particularly, to a filtering device suitable for precision filtering in a state submerged in liquid to be treated. Liquid to be treated includes water for general uses, drinking water, river water, pool water and various other liquids.

Known in the art of filtering devices is one which comprises multi-layered filtering materials of different types provided in a single container through which liquid to be treated is subjected to different filtering operations. One example of such prior art filtering device is shown in FIG. 19. In this prior art filtering device, liquid to be treated is introduced into a container a through an inlet b provided in the upper portion of the container a. The liquid to be treated is spread over an upper filtering material layer d through distributors c. The upper filtering material layer d consists of coarse grains of anthracite and impurities of a relatively large diameter in the liquid to be treated are trapped by the anthracite layer. Then the liquid to be treated flows down through the lower filtering material layer e which consists of fine grains of garnet and impurities of a smaller diameter are trapped by the garnet layer. The treated liquid is collected by a collector screen f and discharged from an outlet g provided in the bottom portion of the container a.

Since most impurities in the liquid to be treated are trapped by the upper layer in this prior art filtering device, the anthracite grains of the upper layer tend to be easily blocked by the impurities and, therefore, frequent reverse washing of the upper layer is necessary. For this purpose, compressed air is blown into the upper and lower layers d and e through the collector screen f to stir the filtering material grains of the upper and lower layers d and e and thereby remove the impurities and then reverse washing water is forced into the upper and lower layers d and e through the collector screen f to wash away the impurities. This reverse washing must be performed accurately because otherwise the impurities, once removed from the anthracite grains but left in the container without being washed away, will fall on the surface of the upper layer d and are deposited thereon.

Another problem in this prior art filtering device is that, since the diameter of a filtering material of the upper layer d is generally larger than the diameter of a filtering material of the lower layer e, if the filtering material of the upper layer d is of the same specific gravity as the filtering material of the lower layer e, the filtering material of the upper layer which is of a larger diameter settles sooner than the filtering material of the lower layer e after stirring of the filtering materials made during the reverse washing operation with the undesirable result that the filtering material of the upper layer d is deposited under the filtering material of the lower layer e. For preventing occurrence of this phenomenon, in the prior art filtering device, coarse grains of anthracite which is of a smaller specific gravity than garnet are used in the upper layer d and fine grains of garnet are used in the lower layer e. Thus, selection of filtering materials for the upper and lower layers is limited by the specific gravity of the filtering material.

More importantly, the prior art filtering device has a relatively small effective filtering surface area in comparison with the size of the container in which the multi-layered filtering materials are provided.

It is, therefore, an object of the present invention to provide a filtering device which has a larger effective filtering surface area than the prior art filtering device.

It is another object of the invention to provide a filtering device which is capable of reducing the amount of impurities deposited on the surface of a filtering material and thereby reducing frequency of a reverse washing operation.

It is another object of the invention to provide a filtering device in which selection of two or more different filtering materials can be made freely without being limited by the specific gravity of the filtering materials to be selected.

Other objects and features of the invention will become apparent from the description made heinbelow with reference to the accompanying drawings.

SUMMARY OF THE INVENTION

For achieving the above described objects of the invention, there is proivded a filtering device comprising a container having an inlet for introducing liquid to be treated, an annular multi-layered prepacked screen assembly provided in said container and having an outlet for treated liquid, said screen assembly comprising three or more cylindrical screens having different diameters and being coaxially disposed in said container with their axes extending vertically in said container, an annulus being formed between respective adjacent cylindrical screens, and two or more different filter materials performing filtering functions which are different from each other and being filled one in each of the annuluses between the cylindrical screens.

According to the invention, an overwhelmingly larger effective filtering surface area than the prior art filtering device is available owing to the structure of the filtering device as defined in the claim. For example, as will be described more fully later, more than ten times as large effective filtering surface area as the prior art filtering device can be obtained in a case of using a container having a diameter of 2 meters and a height of 2 meters.

Further, since screen assembly is vertically disposed in the container, the liquid to be treated enters the vertically disposed screen surfaces of the cylindrical screens. This allows some part of impurities in the liquid to be treated to fall to the bottom of the container due to gravity before entering the cylindrical screens with the result that the amount of impurities trapped by the filtering materials of the cylindrical screens is thereby reduced. As a result, frequency of a reverse washing operation for removing trapped impurities is reduced as compared to the prior art filtering device in which all impurities of the liquid to be treated are trapped by the filtering materials and the working efficiency of the filtering device can thus be improved. Impurities which have settled on the bottom of the container can be removed periodically by opening a drain port provided in the bottom of the container.

Since the filtering materials are prepacked in the cylindrical screens of the annular multi-layered prepacked screen assembly in the form of a cartridge, replacement of the filtering materials by new filtering materials can be made simply by replacing the entire screen assembly and this replacement work will be much easier and less time consuming than in the case of the prior art filtering device in which the filtering materials must be replaced one layer after another.

Since the two or more different filtering materials are partitioned from each other by the cylindrical screens, there is no likelihood of mixing of the different filtering materials with each other during the reverse washing operation. Accordingly, it is not necessary to select, as in the prior art filtering device, filtering materials of different specific gravity for preventing reverse resettling of the filtering materials and, therefore, any desired filtering materials of different filtering functions can be combined freely without considering the specific gravity of each filtering material. This will enable a combination of filtering materials which will achieve a more efficient filtering result at a reduced cost.

Furthermore, since impurities removed from the filtering materials by the reverse washing operation will be completely washed away or fall to the bottom of the container due to gravity and will never return to the surfaces of the filtering materials, efficiency of the reverse washing operation will be improved as compared to the case of the prior art in which some of impurities removed from the filtering materials tends to return to the surface of the filtering material on the upper layer due to gravity.

In one aspect of the invention, each of said cylindrical screens of the screen assembly has a closed cylindrical wall portion extending from one end of the cylindrical screen to form an annular chamber between the respective adjacent cylindrical screens, said annular chamber being continuous to said annulus between the adjacent cylindrical screens filled with the filter material and being unfilled with the filtering material and permitting free upward movement of the filter material within said annular chamber during reverse washing.

According to this aspect of the invention, the filtering materials can move upwardly within the annular chambers during reverse washing whereby turning over of the filtering materials filled in the entire annuluses between the cylindrical screens during reverse washing is permitted and removal of impurities from the filtering materials can thereby be facilitated.

In another aspect of the invention, a plurality of said annular multi-layered screen assemblies are provided in the container and the outlets of said screen assemblies being connected with a common outlet pipe.

In another aspect of the invention, a filtering device comprises a plurality of such filtering devices which are disposed in parallel, the inlets of liquid to be treated and the common outlet pipes of said filtering devices being connected respectively with common connecting pipes to form a module.

In another aspect of the invention, a filtering device comprises a plurality of such filtering devices forming a module, the common connecting pipes of said filtering devices being further connected respectively with common connecting pipes to form a larger module.

In another aspect of the invention, an innermost screen of said screen assembly comprises support rods extending in the axial direction of the screen and arranged generally cylindrically with a predetermined interval, and a cylindrical filter member attached fixedly on the outside of the support rods, and said filtering devices further comprises a vibrator including a shaft provided in the central portion of the screen coaxially with the screen and at least one leaf spring which is fixed in one end portion thereof to the shaft and is capable of abutting in the other end portion against a part of each of the support rods, and a drive unit for rotating at least one of the screen assembly and vibrator.

According to this aspect of the invention, by rotating at least one of the screen assembly and the vibrator, one end portion of the leaf spring sequentially abuts against each of the cylindrically arranged support rods and is disengaged therefrom and, by the impact of the leaf spring abutting against the support rods, slight vibration occurs in each support rod and the filter member which is fixed thereto. Powdery suspending solid particles of impurities in the liquid to be treated which tend to be deposited on the surface of the filter member as the liquid enters the filter member are shaken off from the surface of the filter member by this vibration, so that these suspending solids are kept away from the surface of the filter member whereby blocking of the filter member can be prevented. The filtering device therefore can prevent blocking of filter elements while continuing the filtering operation without stopping the filtering operation for reverse washing.

In another aspect of the invention, an outermost screen of said screen assembly comprises support rods extending in the axial direction of the screen and arranged generally cylindrically with a predetermined interval, and a cylindrical filter member attached fixedly on the inside of the support rods, and said filtering device further comprises a vibrator including a frame provided on the outside of the screen coaxially with the screen and extending in the axial direction of the screen and at least one leaf spring which is fixed in one end portion thereof to the frame and is capable of abutting in the other end portion against a part of each of the support rods, and a drive unit for rotating at least one of the screen assembly and vibrator.

According to this aspect of the invention, a similar effect of shaking off of solid particles of impurities by vibration can be obtained.

In another aspect of the invention, a filtering device further comprises flow creating means for creating, in said container, a flow of the liquid to be treated having a direction which is different from direction of a flow of the liquid to be treated into the screen assembly.

According to this aspect of the invention, a flow of the liquid to be treated having a direction which is different from direction of a flow of the liquid to be treated into the screen is created and powdery suspending solid particles of impurities in the liquid to be treated which tend to be deposited on the surface of the screen as the liquid enters the screen are washed away from the surface of the screen by this flow having the different direction from the flow into the screen, so that these suspending solid particles are kept away from the surface of the screen whereby blocking of the screen can be prevented. The filtering device therefore can prevent blocking of filter elements while continuing the filtering operation without stopping the filtering operation for reverse washing.

In another aspect of the invention, a filtering device further comprises a reverse washing tube provided coaxially in an innermost screen of said screen assembly and rotatably about the axis thereof, said reverse washing tube having an inlet for the treated liquid in one end portion thereof and an opening for discharging the treated liquid and introducing reverse washing water in the other end portion thereof and having a plurality of reverse washing water injecting holes at a predetermined interval in the axial direction of the tube, a liquid transfer tube communicating with the opening for discharging the treated liquid and introducing reverse washing water, a check valve provided on the side of the opening for discharging the treated liquid and introducing reverse washing water in the vicinity of the inlet for the treated liquid of said reverse washing tube for permitting flow of the treated liquid from said inlet into the reverse washing tube and prohibiting flow of the reverse washing water from inside of the reverse washing tube to said inlet, and means for rotating the reverse washing tube about its axis.

According to this aspect of the invention, by injecting pressurized reverse washing water from the reverse washing water injecting holes of the rotating reverse washing tube, reverse washing water is jetted out in a jet stream and this jet stream sequentially collides with the entire inner peripheral walls of the cylindrical screens thereby uniformly removing the impurities blocking the cylindrical screens.

In still another aspect of the invention, an outermost screen of said screen assembly is a wedge wire screen having a screen slit formed on the outside of the screen and having an opening which widens radially inwardly from the screen slit.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

FIGS. 1 to 5 illustrate an embodiment of the filtering device made according to the invention.

Figure 1:
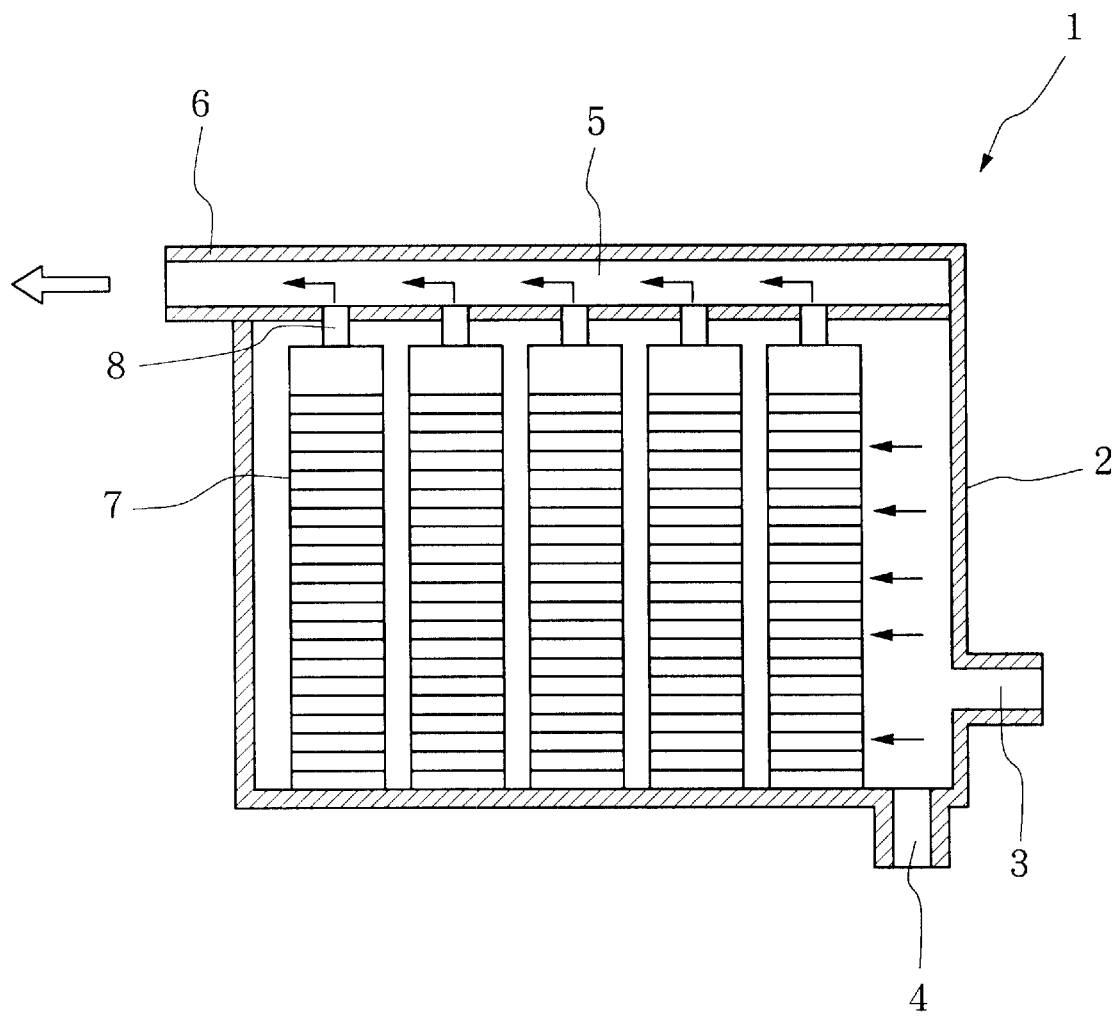
FIG. 1 is a sectional view showing an embodiment of the invention.

FIG. 1 schematically illustrates a structure of a filtering device 1. A container 2 is of a box-like configuration and has an inlet 3 for liquid to be treated in a lower portion of one end portion thereof and a drain port 4 in a bottom portion thereof. The drain port 4 is normally closed and is opened when solid particles of impurities which have settled on the bottom of the container 2 are to be removed. The upper portion of the container 2 is constructed as a treated liquid discharge pipe 5 which has an outlet 6.

In this container 2 are provided one or more annular multi-layered prepacked screen assemblies (5 screen assemblies in the illustrated embodiment) which are designated by reference character 7. Each of the screen assemblies 7 has an outlet 8 in the upper portion thereof and this outlet 8 communicates with the treated liquid discharge pipe 5.

Figure 2:
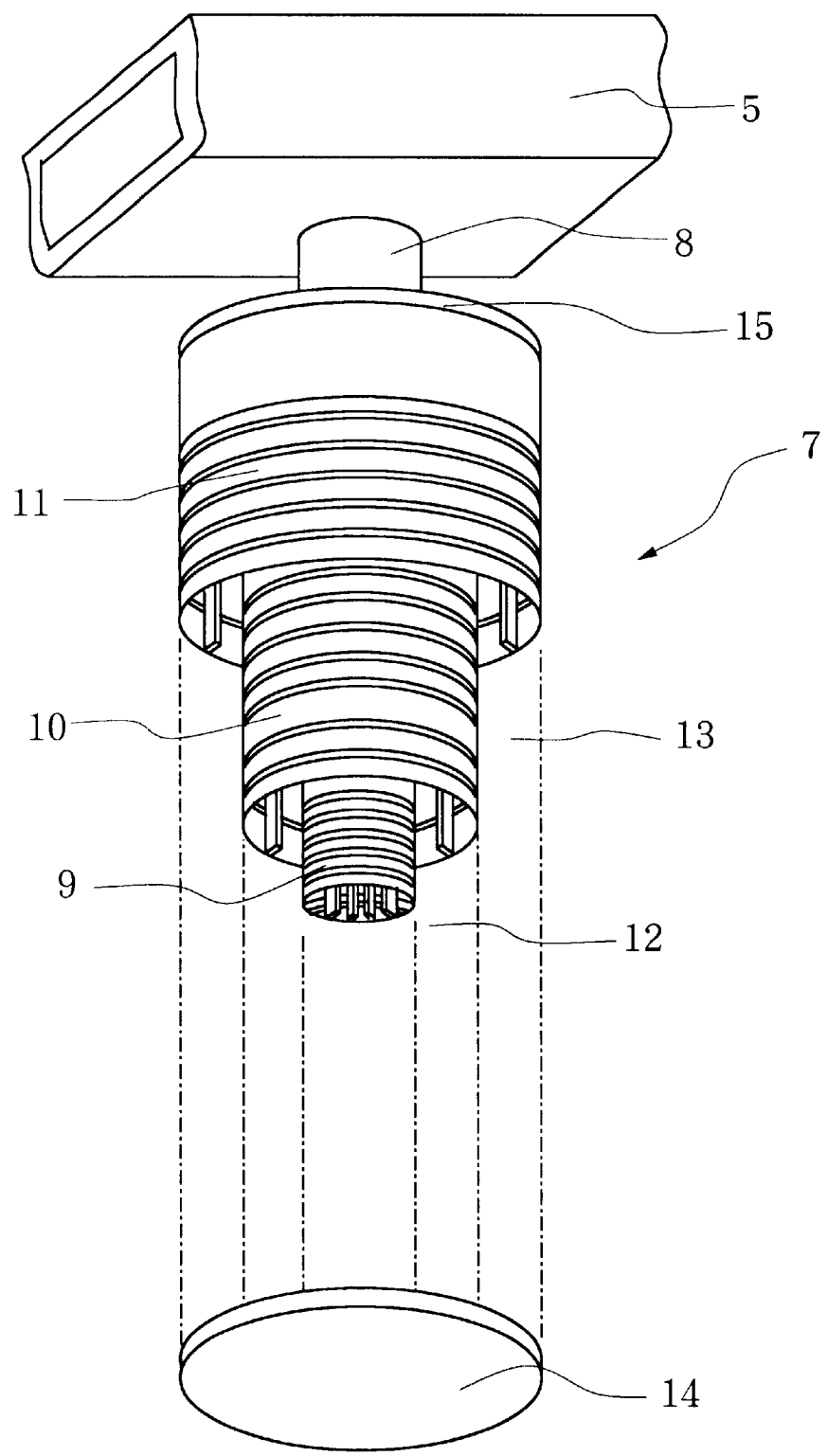
FIG. 2 is a perspective view of an annular multi-layered prepacked screen assembly used in the embodiment of FIG. 1 shown in a state in which filtering materials are not filled in the annuluses of the screens.
Figure 3:
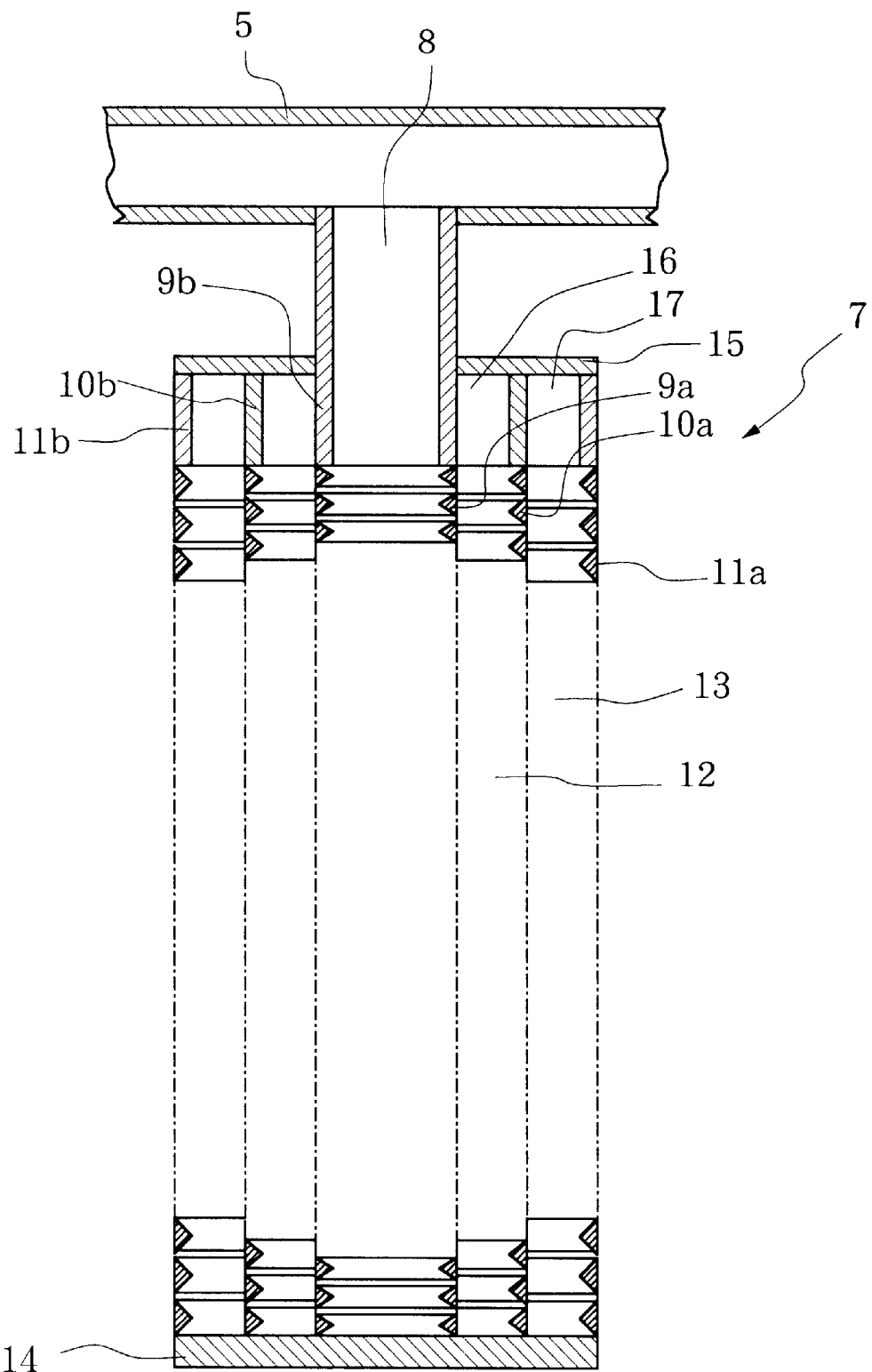
FIG. 3 is a sectional view of the screen assembly of FIG. 2.
Figure 4:
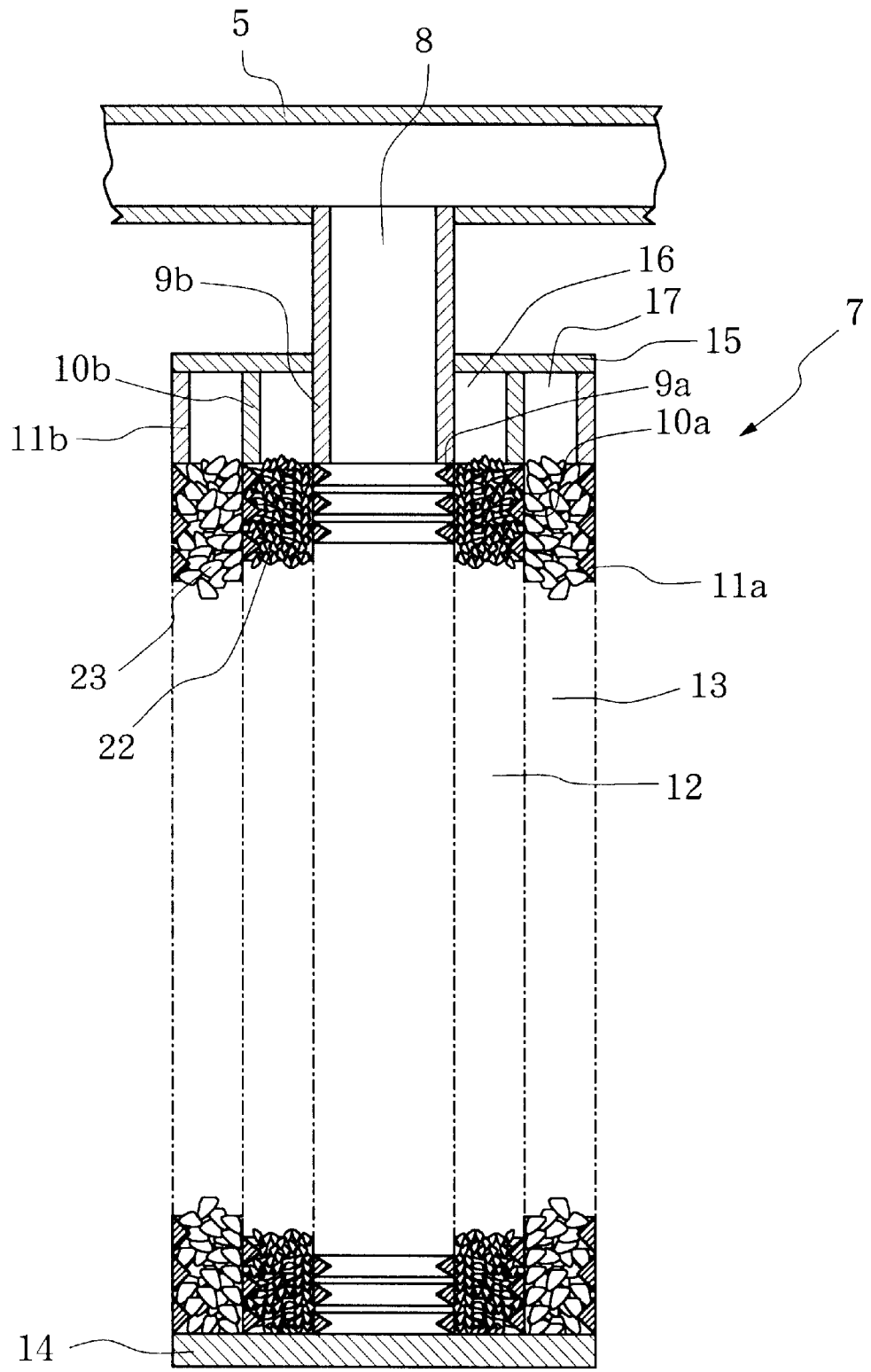
FIG. 4 is a sectional view of the screen assembly with filtering materials filled in the annuluses of the screens.

FIG. 2 shows an example of the annular multi-layered prepacked screen assembly 7 in a state in which filtering materials are not filled in annulues between cylindrical screens. In FIG. 2, illustration of a part of each of cylindrical screens constituting the screen assembly 7 is omitted for better understanding of the screen assembly. FIG. 3 is a sectional view of the screen assembly in a state where filtering materials are not filled in.

The annular multi-layered prepacked screen assembly 7 includes three cylindrical screens of different diameters, namely an innermost cylindrical screen 9 having the smallest diameter, an intermediate cylindrical screen 10 having a diameter larger than the innermost screen 9 and an outermost cylindrical screen 11 having the largest diameter. The cylindrical screens 9, 10 and 11 are coaxially disposed in the container 2 with their axes extending vertically in the container 2. An annulus 12 is formed between the innermost cylindrical screen 9 and the intermediate cylindrical screen 10 and an annulus 13 is formed between the intermediate cylindrical screen 10 and the outermost cylindrical screen 11. A bottom plate (seal plate) 14 in the form of a disk is fixedly connected to the bottom end portions of the respective cylindrical screens 9, 10 and 11 and top end portions of the cylindrical screens 10 and 11 are closed with a top plate 15 in the form of a disk. The screen assemblies 7 are placed on the bottom surface of the container 2 and are erected vertically therefrom.. The cylindrical screens 9, 10 and 11 have closed wall portions 9b, 10b and 11b extending from screen portions 9a, 10a and 11a of the cylindrical screens 9, 10 and 11 to form an annular chamber 16 between the closed wall portions 9b and 10b and an annular chamber 17n between the closed wall portions. 10b and 11b. These annular chambers 16 and 17 are continuous to and located above the annuluses 12 and 13. The closed wall portion 9b of the innermost cylindrical screen 9 extends above the top plate 15 and fitted in the treated liquid discharge pipe 5. The upper opening portion of the closed wall portion 9b of the innermost cylindrical screen 9 constitutes the outlet 8 of the screen assembly 7.

Figure 5:
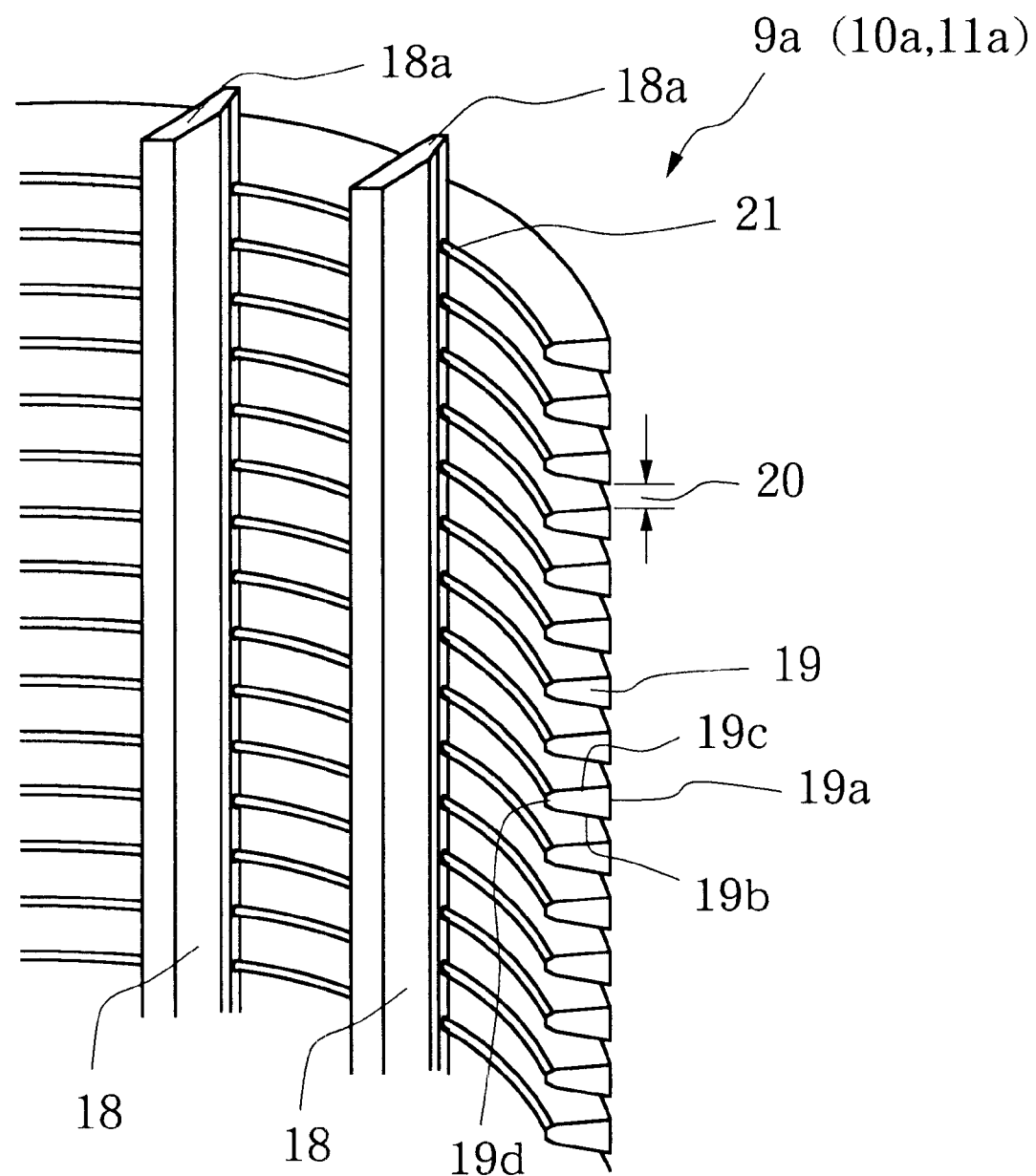
FIG. 5 is a partial enlarged perspective view of the cylindrical screen.

The screen portions 9a, 19a and 11a of the cylindrical screens 9, 10 and 11 in this embodiment are respectively made of a wedge wire screen. The screen portions 9a, 10a and 11a each have, as shown in FIG. 5, support rods 18 extending in the axial direction of the screen portions 9a, 10a and 11a and arranged generally cylindrically with a predetermined interval and having a projecting portion 18a in a radially outward end portion and a wedge wire 19 wound spirally on the outside of the support rods 18 in substantially crossing direction to the support rods 18. The wedge wire 19 is arranged with its one side 19a facing ouside and two other sides 19b and 19c forming a slit 20 which widens radially inwardly between adjacent wedge wire portions and with an inward apex 19d of the wedge wire 19 being welded to the projecting portion of the support rods 18 at crossing-points 21 of the wedge wire 19 and the support rods 18.

Two or more different granular filter materials, performing filtering functions which are different from each other are provided in each of the annuluses between the cylindrical screens. The two different filter materials 22 and 23 perform filter functions which are different from each other and are filled one in each of the annuluses 12 and 13. For example, coarse sand grains may be filled in the outer annulus 13 and active carbon grains may be filled in the inner annulus 12. For another example, active carbon grains may be filled in the outer annulus 13 and ion exchange resin grains may be filled in the inner annulus 12. Various other combinations of different filtering materials will be available for performing desired filtering operations by these filtering materials. It is an advantage of the filtering device according to the invention that one need not consider differences in specific gravity between filtering materials to be selected and, therefore, freedom of selection of filtering materials is broadened as compared to the prior art filtering device.

The filtering materials 22 and 23 may be filled up to a level slightly above the borderline between the screen portions 9a, 10a and 11a and the closed wall portions 9b, 10b and 11b but the filtering materials 22 and 23 should not fill up the annular chambers 16 and 17. This arrangement is necessary for allowing free upward movement of the filtering materials 22 and 23 within the annular chambers 16 and 17 during a reverse washing operation.

In the above described embodiment, three cylindrical screens forming two annuluses constitute the screen assembly. Alternatively, the screen assembly may be constructed of four or more cylindrical screens forming three or more annuluses and three or more different filtering materials may be employed to fill in these annuluses.

In operation, liquid to be treated is introduced from the inlet 3 of the container 2 and enters the outermost cylindrical screen 11 of the annular multi-layered prepacked screen assemblies 7 through the slits 20 and is subjected to two different filtering operations through the filtering materials 23 and 22 and then enters the innermost cylindrical screen 10. The treated liquid then flows to the treated liquid discharge pipe 5 through the out let 8 of the screen assembly 7 and is discharged from the outlet 6.

Impurities, i.e., powdery suspending solid particles in the liquid to be treated which are not trapped by the filtering materials but fall to the bottom of the container 2 due to gravity are removed periodically from the bottom of the container by opening the drain port 4 which is normally closed.

When a reverse washing operation is performed, the inlet 3 is closed and introduction of liquid to be treated is stopped and reverse washing water is introduced from the outlet 6 of the treated liquid discharge pipe 5 and forced into the annulues 12 and 13 between the cylindrical screens 9, 10 and 11. The reverse washing water flows to the drain port 4 and removes impurities which have blocked the filtering materials 22 and 23 and the slits 20 of the cylindrical screens 9, 10 and 11. During the reverse washing operation, the uppermost portions of the filtering materials 22 and 23 filled in the annuluses 12 and 13 which are stirred by the reverse washing water bulge or move upwardly within the annular chambers 16 and 17 and this allows turning over of the lower portions of the filtering materials 22 and 23 within a limited space made available by the upward movement of the upper portion of the filtering materials 22 and 23 due to reverse washing. Thus, the entire filtering materials 22 and 23 filled in the annuluses 12 and 13 are turned over and removal of impurities from the filtering materials 22 and 23 thereby is facilitated.

Figure 6:
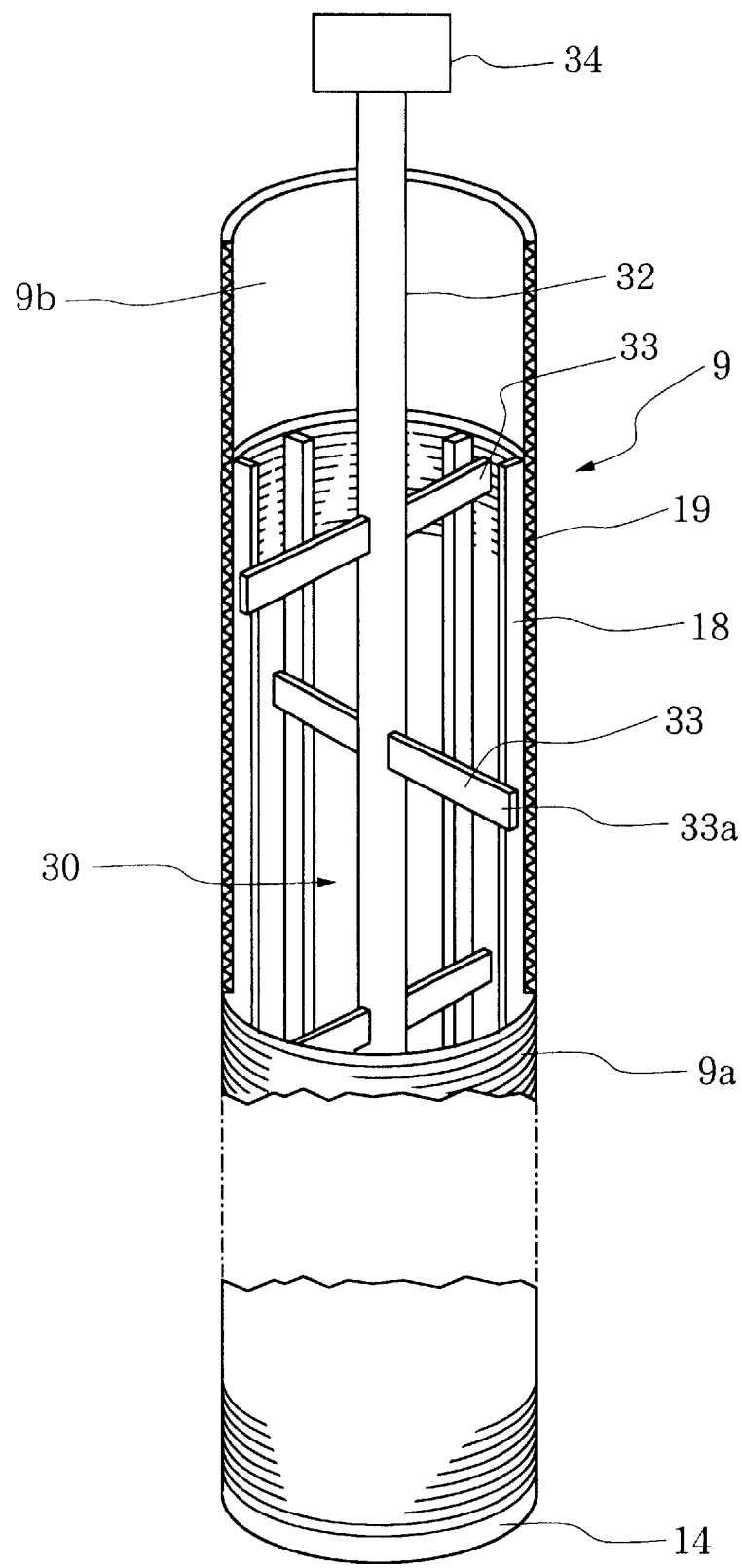
FIG. 6 is a perspective view of another embodiment of the invention.

Another embodiment of the invention will now be described with reference to FIG. 6. In this embodiment, a vibrator 30 is provided in the innermost screen 9 of the embodiment shown in FIGS. 1 to 5. In the embodiment of FIG. 6, the same component parts as the embodiment of FIGS. 1 to 5 are designated by the same reference characters and description thereof will be omitted. In FIG. 6, the innermost cylindrical screen 9 only is illustrated and illustration of the other cylindrical screens 10 and 11 is omitted.

The vibrator device provided in the innermost cylindrical screen 9 is described in the applicant's copending U.S. patent application Ser. No. 09/012,292 and the description of this copending application is incorporated herein by reference.

In the innermost cylindrical screen 9 is provided a vibrator 30 which consists of a shaft 32 which is disposed in the central portion of the screen 9 coaxially with the screen 9 and a plurality of leaf springs 33 which are fixed to the shaft 32. The upper end portion of the shaft 32 is projecting from the upper end of the screen 9 and is connected to a vibrator drive unit 34 which is provided in the upper portion of the container 2 above the top plate 15. The vibrator drive unit 34 is imparted with a driving force by means of an unillustrated motor and drives the shaft 32 to rotate at a predetermined speed.

Pairs of the leaf springs 33 are fixed to the shaft 32 along the entire length of a portion of the shaft 32 located in the screen 9 in such a manner that each pair of the leaf springs 33 extend in the radial direction of the screen 9 and cross adjacent pairs of the leaf springs 33. The radial length of each leaf spring 33 is so determined that the front end portion 33a of the leaf spring 33 comes into abutting engagement with the radially inside portion of each support rod 18.

During the filtering operation, the shaft 32 of the vibrator 30 is rotated by the vibrator drive unit 34. Assuming now that the shaft 32 is rotated counterclockwise, the leaf spring 33 moves from a state shown in FIG. 1 to a state where the front end portion 33a of the leaf spring 33 abuts against the radially inside portion of the support rod 18. The leaf spring 33 is pushed and bent and thereby is resiliently disengaged from the support rod 18. Thus, while the shaft 32 is rotating, a slight vibration is imparted to each support rod 18 and the wedge wire 19 which is the filter member fixed to the support rod 18 by the impact of the leaf spring 33 abutting against the support rod 18. This vibration is imparted from the innermost cylindrical screen 9 to the other cylindrical screens 10 and 11 so that the entire screen assembly 7 is vibrated by the vibrator 30.

Powdery suspending solid particles of impurities in the liquid to be treated which tend to be deposited on the surface of the filter member as the liquid enters the filter member are shaken off from the surface of the filter member by this vibration, so that these suspending solids are kept away from the surface of the filter member whereby blocking of the filter member can be prevented. The filtering device therefore can prevent blocking of filter elements while continuing the filtering operation without stopping the filtering operation for reverse washing.

Figure 7:
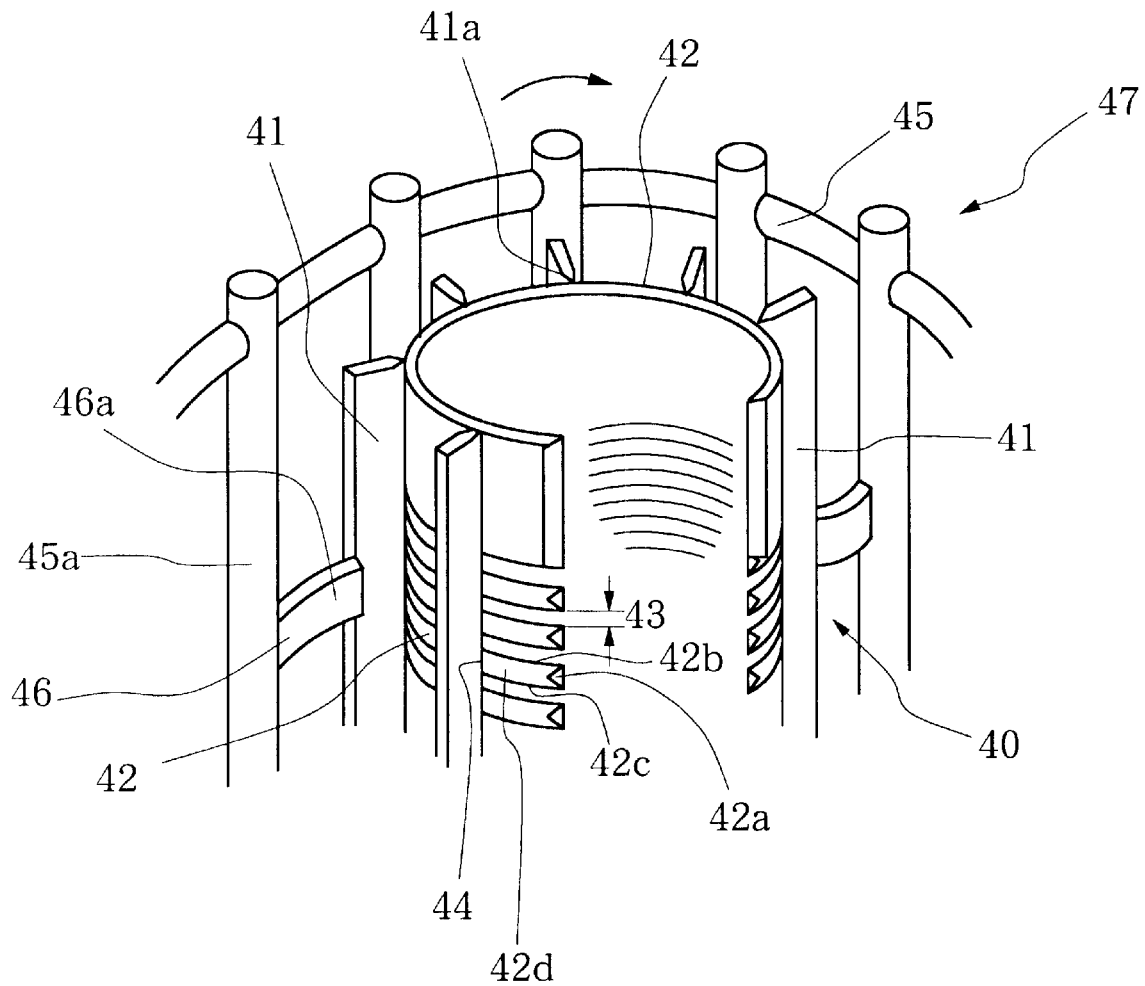
FIG. 7 is a partial perspective view of another embodiment of the invention.

FIG. 7 illustrates another embodiment of the invention. This vibrator 47 of this embodiment is described again in the applicant's copending U.S. patent application Ser. No. 09/012,292 and is incorporated herein by reference. This embodiment is suitable for uses in a filtering device in which, conversely to the embodiment of FIGS. 1 and 6, liquid to be treated is caused to flow from the inside of the screen assembly to the outside thereof and powdery solid particles of impurities are collected in the vicinity of the inside surface of the wedge wire.

In the embodiment of FIG. 7, an outermost cylindrical screen 40 only is illustrated and illustration of an intermediate and innermost cylindrical screens is omitted.

In this embodiment, a cylindrical screen 40 includes, as shown in FIG. 7, suuport rods 41 extending in the axial direction of the screen 40 and arranged generally cylindrically with a predetermined interval and having a projecting portion 41a in a radially inward end portion and a wedge wire 42 wound spirally on the inside of the support rods 41 in substantially crossing direction to the support rods 41. The wedge wire 42 is arranged with its one side 42a facing inside and two other sides 42b and 42c forming a slit 43 which widens radially outwardly between adjacent wedge wire portions and with an outward apex portion 42d being welded to the projecting portion 41a of the support rods 41 at crossing points 44 of the wedge wire 42 and the support rods 41. The wedge wire 42 constitutes a cylindrical filter member.

On the outside of the screen 40 is provided a vibrator 47 which consists of a cylindrical frame 45 in the shape of a lattice extending in the axial direction of the screen 40 and a plurality of leaf springs 46 which are fixed at one end portions thereof to axially extending bars 45a of the frame 45 and are capable of abutting against the support rods 41 at the other end portion thereof.

The frame 45 is connected at one end portion thereof to an unillustrated drive unit and the frame 45 is rotated by this drive unit.

Pairs of the leaf springs 46 are filxed to the axial bars 45a of the frame 45 along the entire length of a portion of the frame 45 in which the screen 40 is located in such a manner that each pair of the leaf springs 46 extend in the radial direction of the screen 40 and cross adjacent pairs of the leaf springs 46. The radial length of each of the leaf springs 46 is so determined that the front end portion 46a of the leaf spring 46 comes into abutting engagement with the radially ousdie portion of each support rod 41.

During the filtering operation, liquid to be treated is caused to flow from the inside to the outside of thescreen 40. As the frame 45 is rotated clockwise in FIG. 7, each leaf spring 46 sequentially abuts against and disengages resiliently from each support rod 41 and repeats this action thereby imparting a slight vibration to the wedge wire 42 through the support rods 41. By this arrangement, the vibration is transferred to the intermediate and innermost cylindrical screens 10 and 9 so that the entire screen assembly 7 is vibrated and, accordingly, powdery solid particles of impurities in the screen are shaken off. Thus, a similar effect to the filtering device shown in FIG. 6 can be obtained.

Figure 8:
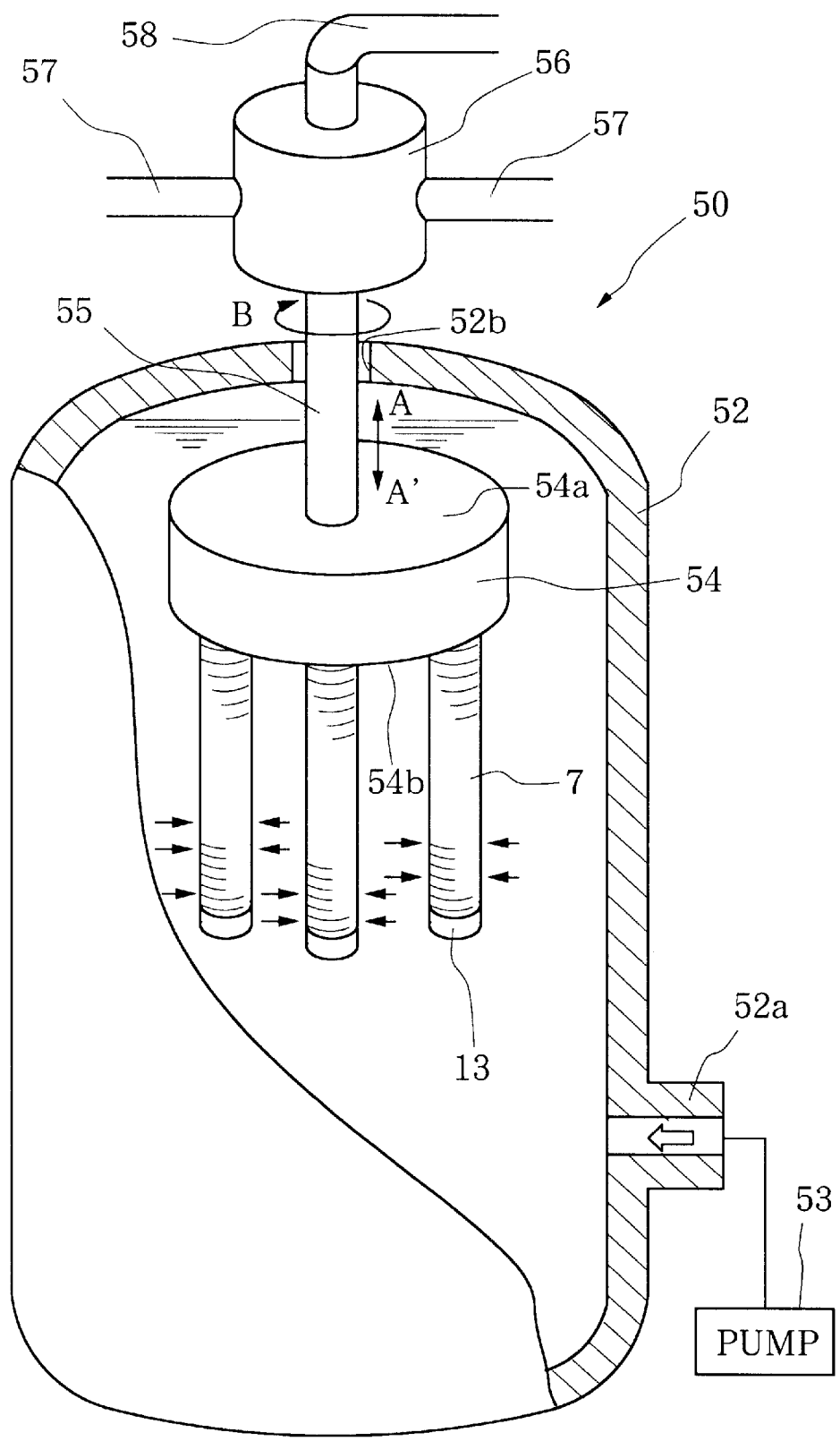
FIG. 8 is a perspective view of another embodiment of the invention.
Figure 9:
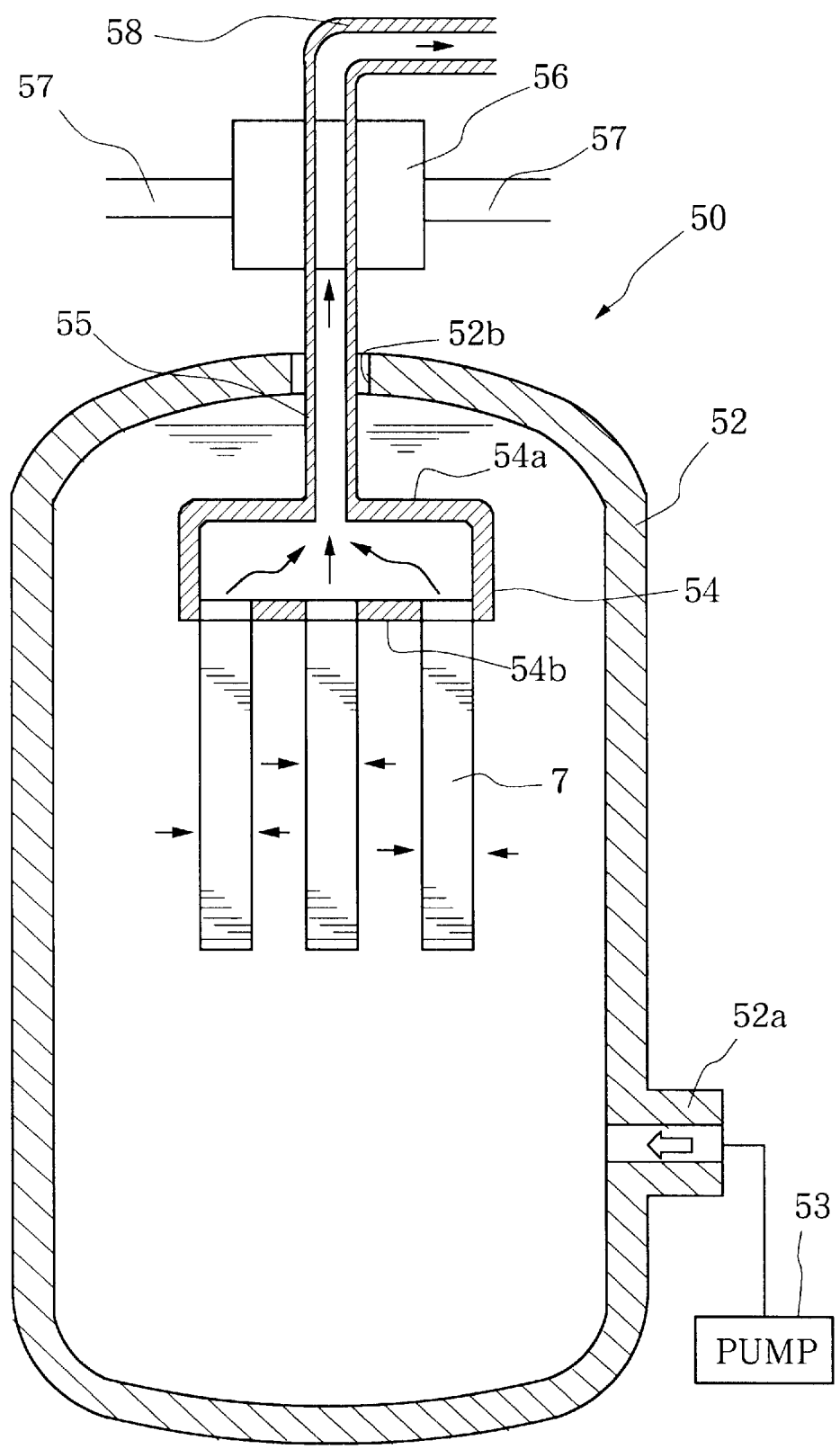
FIG. 9 is a sectional view of the embodiment shown in FIG. 8.

FIGS. 8 and 9 illustrate another embodiment of the invention. The means for producing a flow of different direction from the flow into the screen assemblies is described in the applicant's copending U.S. patent application Ser. No. 09/050,618 and is incorporated herein by reference.

A filtering device 50 has a container 52 having a circular cross section. An inlet 52a for introducing liquid to be treated is formed in the lower portion of the container 52. A pump 53 is connected to the filtering device 50. The liquid to be treated is filled nearly to the upper end wall of the container 52. A screen holder 54 of a short cylindrical configuration closed in its upper and lower end portions by a top plate 54a and a bottom plate 54b is suspended in the liquid to be treated in the container 52 by mewans of a holloiw drive shaft 55 which extends vertically through an opening 52b formed in the top wall of the container 52 and is fixedly secured at its lower end portion to the top plate 54a of the screen holder 54 and connected at it upper end portion to a drive unit 56 which in turn is fixed to an upper frame 57 of the filtering device 50.

A plurality (four in the present embodiment) of annular multi-layered prepacked screen assemblies 7 are secured fixedly to the bottom plate 54b of the screen holder 54 and extend vertically downwardly in a state submerged in the liquid to be treated. The structure of each of the screen assemblies 7 is similar to that of the screen assembly 7 shown in the embodiment of FIGS. 1 to 5 and description thereof will be omitted.

The open upper end portion of the screen assembly 7 communicates with the inside space of the hollow screen holder 54 and the hollow drive shaft 55 also communicates with the inside space of the screen holder 54. The drive shaft 55 extends through the drive unit 56 and a flexible hose 58 which constitutes an outlet of treated liquid is connected to the upper end portion of the drive shaft 55.

The drive unit 56 includes an electric motor (not shown) and a known drive mechanism such as a slider crank mechanism which transfers a reciprocating sliding motion to the drive shaft 55 to thereby reciprocate the drive shaft 55 in the vertical direction. Since such drive mechanism is well known, illustration and detailed description thereof will be omitted.

The operation of this filtering device 50 will now be described.

During the filtering operation, the pump 53 is operated to introduce liquid to be treated from the inlet 52a into each screen assembly 7. The liquid to be treated flows into the screen assembly 7 and flows out of the hose 58 through the inside space of the screen holder 54 and the hollow drive shaft 55.

During the filtering operation, the drive unit 56 is operated continuously to move the drive shaft 55 in a vertical reciprocating motion as shown by arrows A, A'in FIG. 8. By this operation, the screen assemblies 7 which are fixed to the screen holder 54 are also moved in a vertical reciprocating motion and, as a result, there is created a flow of liquid to be treated having a direction of flow which is different from the direction of flow of the liquid to be treated flowing into the screen assemblies 7. That is, a vertical reciprocating flow of liquid is created relative to the surface of the screen assemblies 7 in addition to the horizontal flow of liquid flowing into the screen assemblies 7.

According to this embodiment, powdery solids which tend to be deposited on the surface of the wedge wire are washed away from the surface of the wedge wire by the vertical flow of liquid caused by the vertical reciprocating motion of the screen assemblies 7 and are kept away from the wedge wire. As a result, blocking of the slit of the wedge wire and filtering materials by the powdery solids can be prevented.

In another embodiment of the invention, the drive unit 56 includes an electric motor (not shown) and the drive shaft 55 is connected to the drive shaft of the electric motor through a reduction gear in such a manner that rotation of the electric motor is transferred to the drive shaft 55. In this embodiment, the drive shaft 55 is rotated about its axis as shown by arrow B in FIG. 8 by driving of the electric motor in the drive unit 56 and, the screen holder 54 is also rotated with the drive shaft 54. This creates a vortex flow in the liquid to be treated in the container 52 and this vortex flow constitutes a flow of liquid having a direction which is different from direction of the flow into the screen assemblies 7. As a result, the solid particles which tend to be deposited on the surface of the screen assemblies 7 are washed away by this vortex flow and the same advantage as that in the previously described embodiment of FIG. 8 can be obtained.

Another embodiment of the invention will be described with reference to FIGS. 10 to 13. In this embodiment, the same component parts as those in the embodiment of FIGS. 1 to 5 are designated by the same reference characters and description thereof will be omitted.

Figure 10:
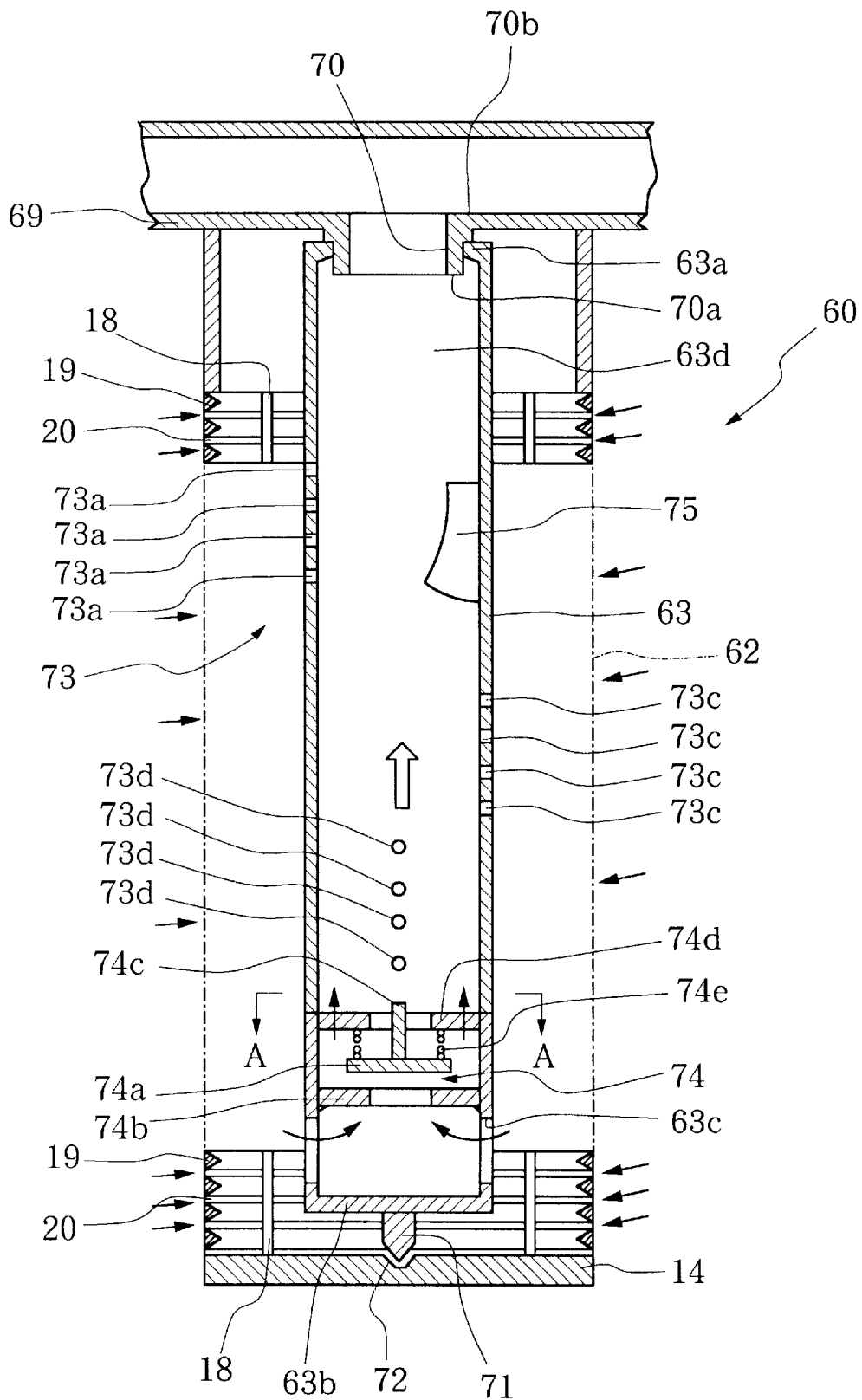
FIG. 10 is a sectional view of another embodiment of the invention during a filtering operation.
Figure 11:
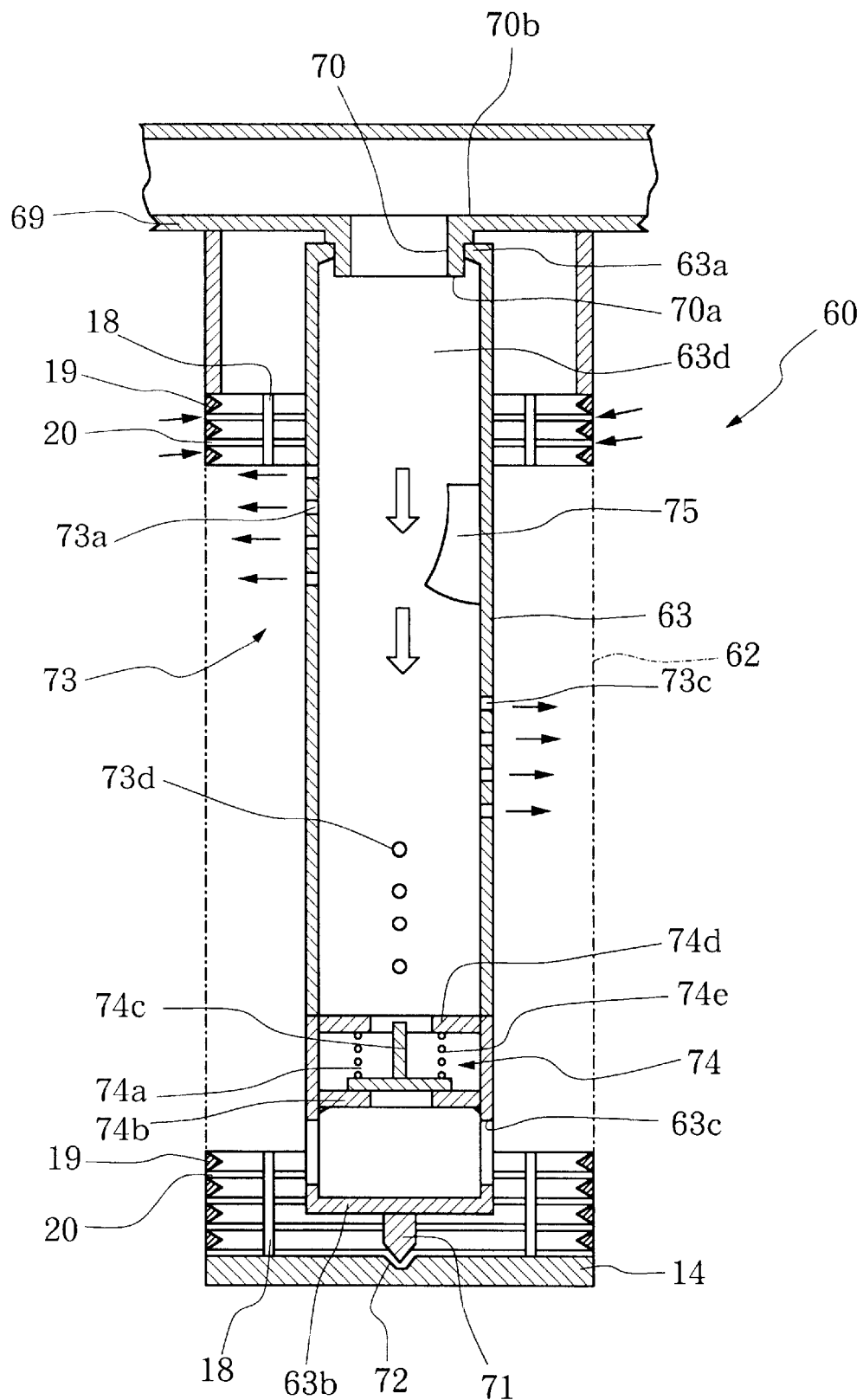
FIG. 11 is a sectional view of the embodiment of FIG. 10 during a reverse washing operation.
Figure 12:
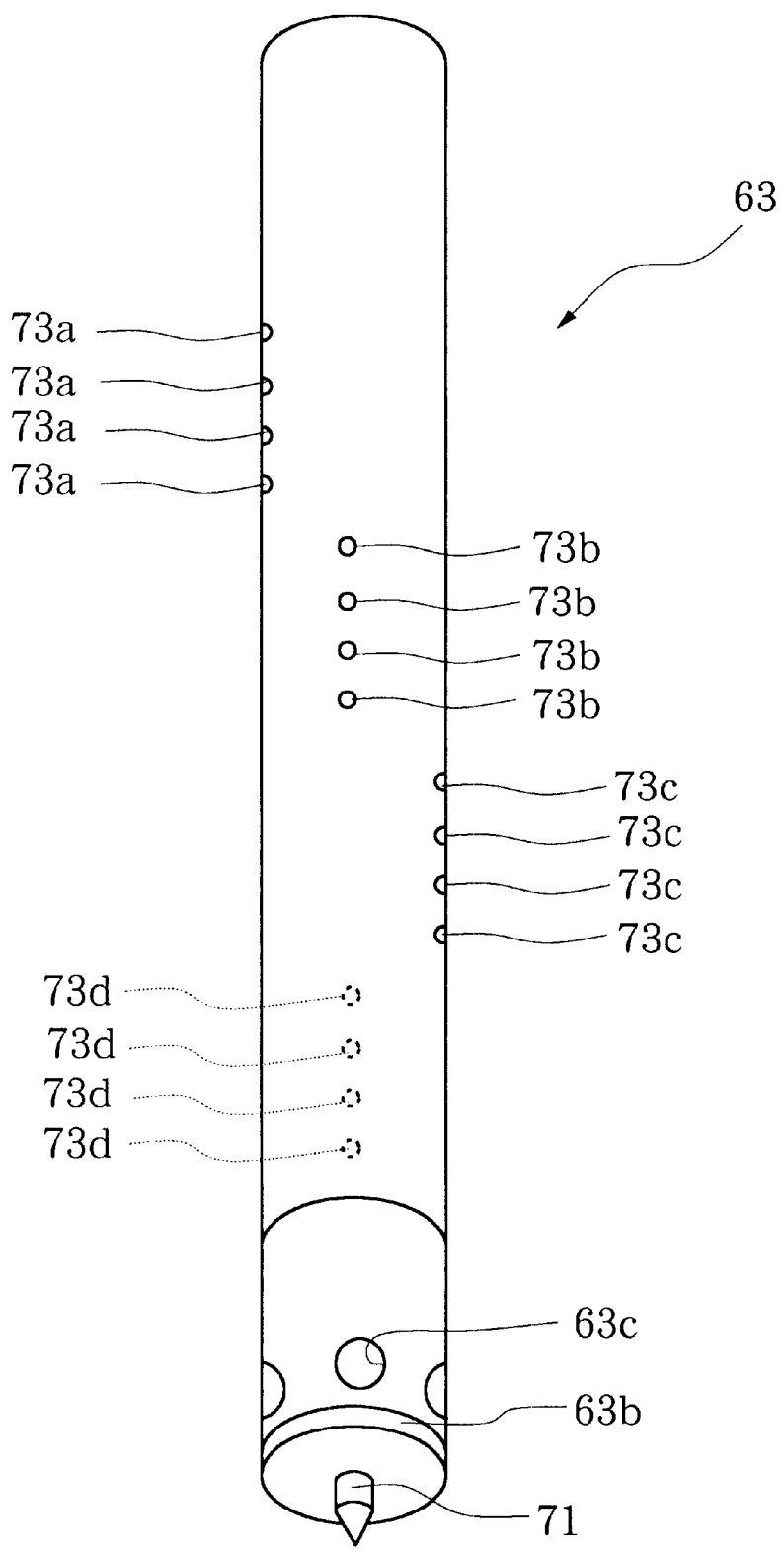
FIG. 12 is a perspective view of a reverse washing tube used in the embodiment of FIGS. 11 and 12.
Figure 13:
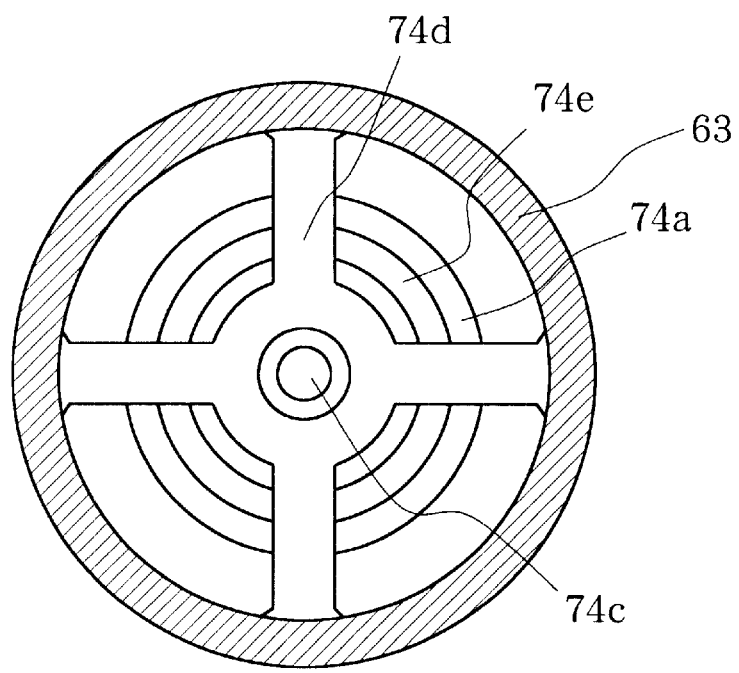
FIG. 13 is a view taken along arrows A, A in FIG. 10.

The filtering device 60 of this embodiment has annular multi-layered prepacked screen assemblies 7 in the container 2 as in the embodiment of FIG. 1. FIGS. 10 and 11 show an innermost cylindrical screen 62 of the screen assembly 7 only and illustration of the other cylindrical screens of the screen assembly 7 is omitted. In FIGS. 10 and 11, support rods 18 and wedge wire 19 are shown in their upper end and lower end portions only and a middle portion thereof is illustrated by chain and dot lines.

A liquid transfer tube 69 of a rectangular cross section is disposed above the innermost cylindrical screen 62. This liquid transfer tube 69 is formed, coaxially with the screen 62, in its bottom portion with a cylindrical opening 70 for discharging treated liquid and introducing reverse washing water. A portion forming the opening 70 has a stepped portion in the vertical direction and a lower portion 70a of this stepped portion has a smaller diameter than an upper portion 70b of the stepped portion.

A reverse washing tube 63 is made of a tubular member disposed coaxially with the screen 62 in the screen 62. The reverse washing tube 63 has an open upper portion which is formed as a sliding portion 63a having an inner diameter which is slightly larger than the outer diameter of the lower portion 70a of the cylindrical opening 70 of the liquid transfer tube 69 and is slidably fitted on the outer peripheral surface of the lower portion 70a of the cylindrical opening 70. The lower end portion of the reverse washing tube 63 is closed with a bottom plate 63b in the form of a disk. A pivot 71 is provided in the central lower surface of the bottom plate 63b. This pivot 71 is fitted in a pivot receiving recess 72 formed in the bottom plate 14 of the screen 62 whereby the reverse washing tube 63 is supported by the screen 62. By this arrangement, the reverse washing tube 63 can rotate about its axis.

The reverse washing tube 63 is formed in its lower end portion with an inlet 63c for treated liquid which inlet consists of a plurality of circular openings. The open upper end portion of the reverse washing tube 63 constitutes an opening 63d for discharging treated liquid and introducing reverse washing water. This opening 63d communicates with the cylindrical opening 70 of the liquid transfer tube 69.

The reverse washing tube 63 has a plurality of reverse washing water injecting holes 73 at a predetermined interval in the axial direction of the tube 63. As will be apparent from FIG. 12, in the present embodiment, groups 73a, 73b, 73c and 73d of four vertically formed injecting holes are provided at an interval of 90 degrees in the circumferential direction. By this arrangement, a trouble in the rotation of the reverse washing tube 63 which may be caused by reaction produced by deviation of injection of reverse washing water in one direction can be prevented.

An optimum value of the diameter of the reverse washing water injecting holes 73 is from 0.5 mm to 0.8 mm. If the diameter exceeds 0.8 mm, pressure of injected reverse washing water is not sufficient and the blocking prevention effect is reduced. If the diameter is below 0.5 mm, there is likelihood that the injecting hole may be blocked by fine dust.

As a preferred example, a reverse washing tube having a diameter of 20 mm may be disposed in an innermost cylindrical screen having a diameter of 70 mm and reverse washing water injecting holes having a diameter of 0.7 mm may be formed at an interval of 5 mm.

A check valve 74 is provided on the side of the opening 63d for discharging treated liquid and introducing reverse washing water in the vicinity of the inlet 63c of the reverse washing tube 63 for the treated liquid. The check valve 74 consists of a valve body 74a in the form of a disk, an annular valve seat 74b on which the valve body 74a can be seated, a stem 74c extending axially upwardly from the valve body 74a, a valve holding member 74d (FIG. 13) which consists of an annular member in which the stem 74c is slidably inserted and four support rods which secure this annular member to the inner wall of the reverse washing tube 63, and a coil spring 74e which is fixed in one end portion thereof to the valve body 74a and fixed in the other end portion thereof to the valve holding member 74d. The coil spring 74e has its spring force adjusted in such a manner that the coil spring 74e is in a contracted state in an unloaded condition and stretches to cause the valve body 74a to be seated on the valve seat 74b when the coil spring 74e is subjected to pressure of reverse washing water. Therefore, the check valve 74 functions to allow flow of the treated liquid into the reverse washing tube 63 from the inlet 63c and prohibit flow of reverse washing water from inside of the reverse washing tube 63 to the inlet 63c.

A blade 75 is attached to the upper inner wall portion of the reverse washing tube 63. This blade 75 constitutes means for rotating the reverse washing tube about its axis during reverse washing. The shape, size and angle of attachment of the blade 75 are determined having regard to the size of the reverse washing tube 63, magnitude of reverse washing pressure and necessary revolving speed of the reverse washing tube 63.

The operation of this embodiment will now be described.

During the filtering operation, liquid to be treated is introduced in the container by means of a pump (not shown). As shown in FIG. 10, the treated liquid flows into the screen 62 through slits 20 of the screen 62 and then flows into the reverse washing tube 63 from the inlet 63c provided in the lower end portion of the reverse washing tube 63. At this time, the check valve 74 is in an opened state as shown in FIG. 10 with its coil spring 74e being contracted so that the treated liquid flows in the direction of arrow through check valve 74 and enters the liquid transfer tube 69 through the opening 63d and the cylindrical opening 70 and is then discharged to the outside.

During reverse washing, the liquid to be treated is discharged from the container and then, as shown in FIG. 11, pressurized reverse washing water is introduced into the reverse washing tube 63 through the cylindrical opening 70 and the opening 63d. The valve body 74a of the check valve 74 is moved downwardly by the force of the pressurized reverse washing water against the force of coil spring 74e and is seated on the valve seat 74b and the check valve 74 thereby is closed. Therefore, the pressurized reverse washing water in the reverse washing tube 63 is injected in a jet stream from the reverse washing water injecting holes 73 and this jet stream collides against the screen 62. In the meanwhile, the reverse washing water collides with the blade 75 and, therefore, the reverse washing tube 63 is thereby rotated about its axis. As a result, the jet stream sequentially collides with the entire peripheral wall of the screen 62 as the reverse washing tube is rotated so that impurities blocking the screen 62 and filtering materials in the annuluses of the screen assembly 7 are uniformly removed.

Figure 14:
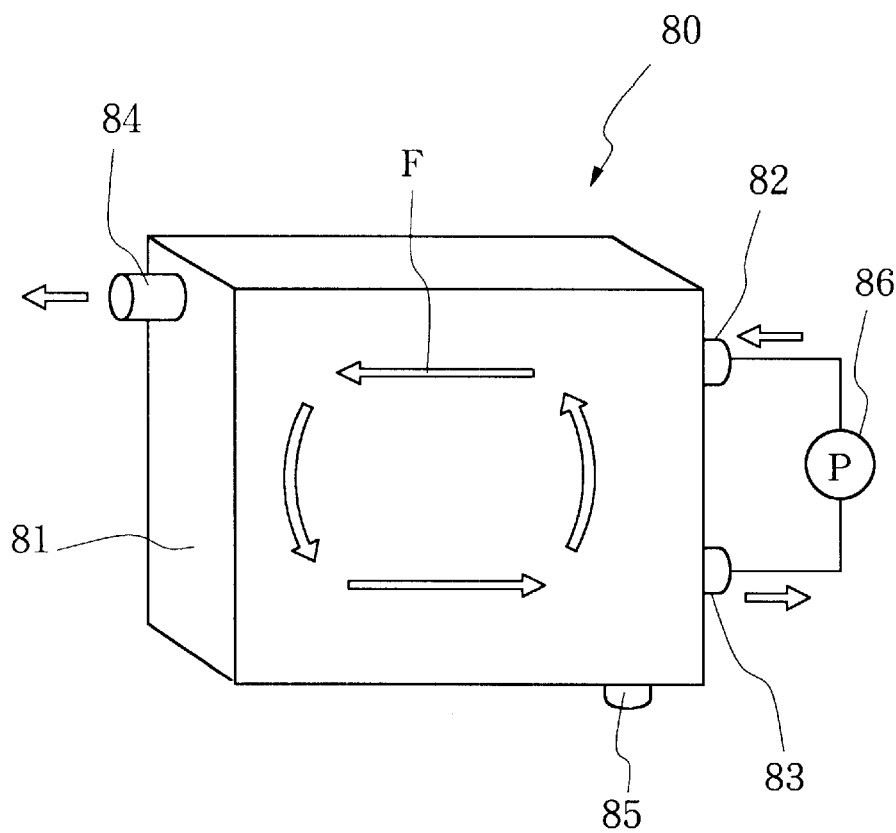
FIG. 14 is a perspective view schematically illustrating another embodiment of the invention.
Figure 15:
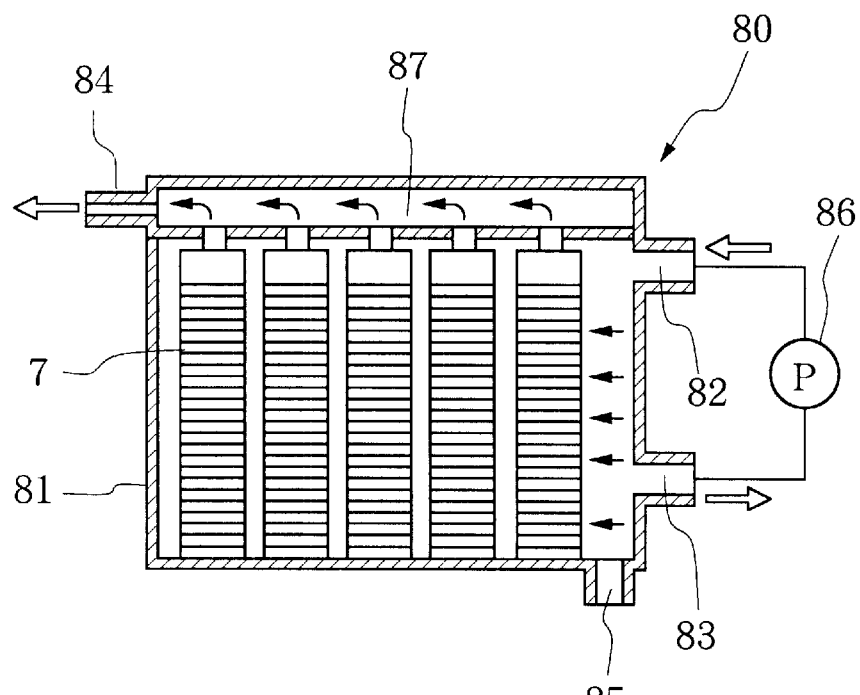
FIG. 15 is a sectional view of the embodiment of FIG. 13.

FIGS. 14 and 15 show another embodiment of the invention.

In this embodiment, a filtering device 80 includes a box-like container 81 which contains a plurality (five in the illustrated example) of annular multi-layered prepacked screen assemblies 7 provided in parallel. The structure of each of the screen assemblies 7 is substantially the same as that of the embodiment shown in FIGS. 10 to 13. The opening for discharging treated liquid and introducing reverse washing water in each screen assembly 7 communicates with a common liquid transfer tube 87.

The container 81 has an inlet 82 for liquid to be treated, an outlet 83 for liquid to be treated, liquid transfer opening 84 communicating with the liquid transfer tube 87 and a drain port 85 which is normally closed and can be opened during draining of impurities. The inlet 82 for liquid to be treated has a larger diameter than the liquid transfer opening 84. A pump 86 is connected between the inlet 82 for liquid to be treated and the outlet 83 for liquid to be treated to form a closed loop within which the liquid to be treated circulates. By the action of the pump 86 which causes liquid to be treated in an amount of treated liquid flowing out of the liquid transfer opening 84 to flow forcibly into the container 81 from the inlet 82, a flow of the liquid to be treated as shown by the arrow F in FIG. 14 which has a direction different from the direction of flow of liquid to be treated into the screen assemblies 7 is created in the container 81.

During the filtering operation, the drain port 85 is closed and the liquid to be treated is introduced from the inlet 82 into the container 81. The liquid to be treated enters the screen assemblies 7 and the treated liquid is discharged from the liquid transfer opening 84 through the liquid transfer tube 87. In the meanwhile, excess liquid to be treated circulates in the container 81 in the form of a flow having a direction which is different from the flow into the screen assemblies 7 whereby powdery solid particles of impurities which cause blocking of the filtering materials can be washed away from the surface of the screen assemblies 7 and the amount of blocking is thereby reduced.

During reverse washing, the inlet 82 and the outlet 83 of the container 81 are closed and the liquid to be treated is discharged after filtering. Then, the drain port 85 is opened and pressurized reverse washing water is forced into the screen assemblies 7 through the liquid transfer opening 84 to perform reverse washing in the manner described above with respect to FIGS. 10 to 13. The soiled water after reverse washing is drained out from the drain port 85.

Figure 16:
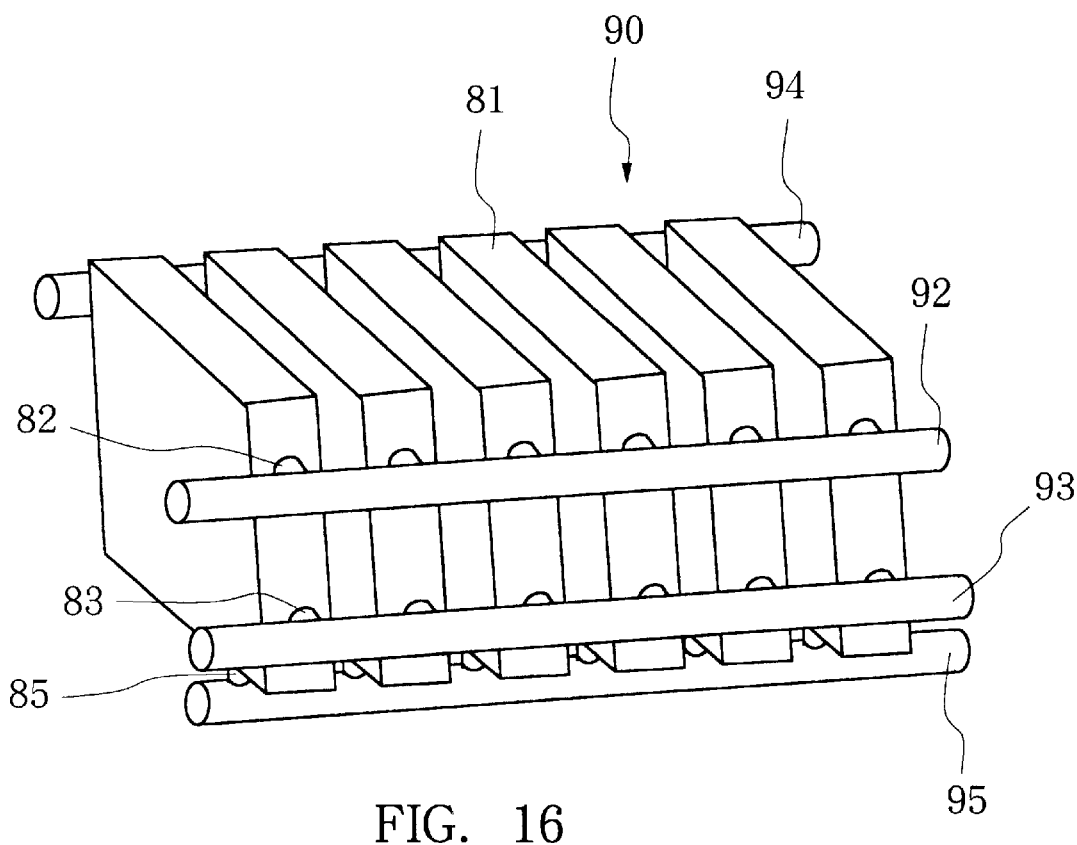
FIG. 16 is a perspective view schematically illustrating another embodiment of the invention.

FIG. 16 shows an embodiment in which a plurality (six in the illustrated example) of the containers 81 of FIGS. 14 and 15 are disposed in parallel and the inlets 82, outlets 83, liquid transfer openings 84 and drain ports 85 of these containers 81 are connected by common connecting pipes 92, 93, 94 and 95 to combine into a small module 90.

Figure 17:
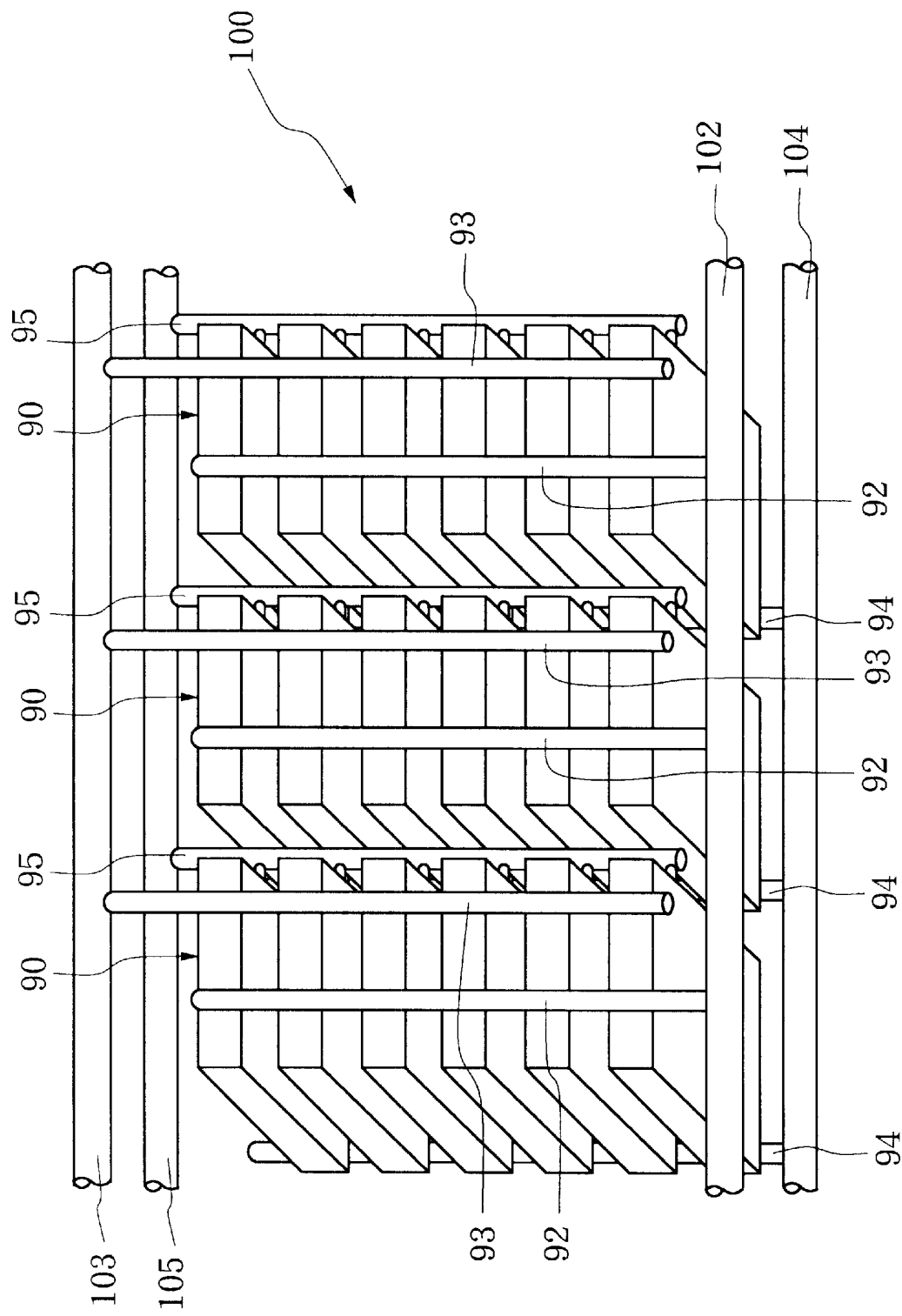
FIG. 17 is a perspective view schematically illustrating another embodiment of the invention.

FIG. 17 shows an embodiment in which a plurality (three in the illustrated example) of the small modules 90 are disposed in parallel and the common connecting pipes 92, 93, 94 and 95 are connected further by common connecting pipes 102, 103, 104 and 105 respectively to combine into a larger module 100.

Figure 18:
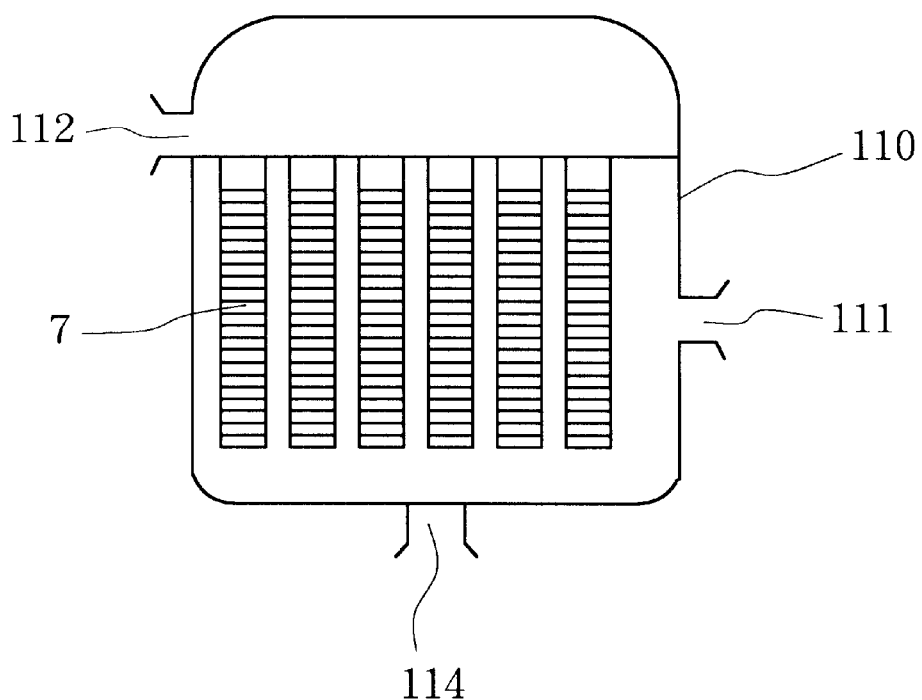
FIG. 18 is a sectinal view showing another embodiment of the invention.
Figure 19:
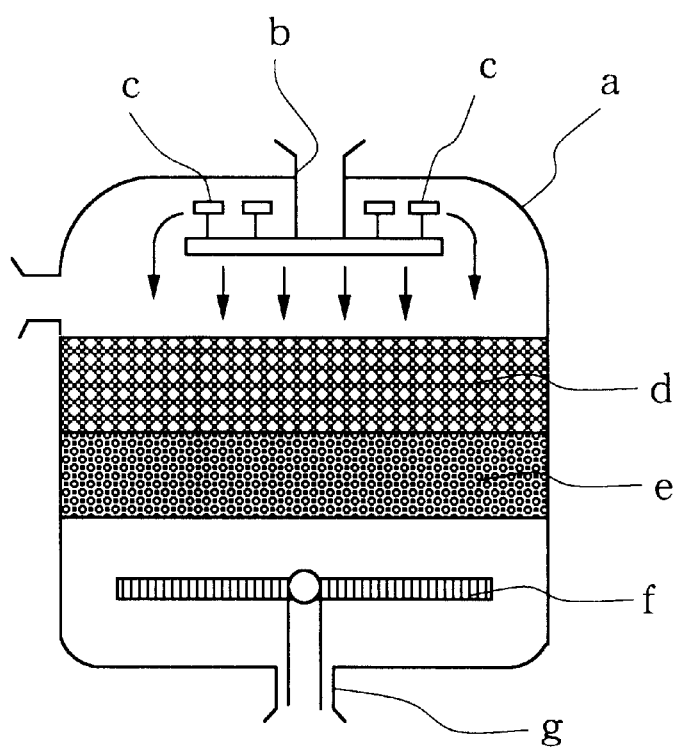
FIG. 19 is a sectional view showing a prior art filtering device.

FIG. 18 shows an embodiment in which a multiplicity of screen assemblies 7 are provided in a container similar to the container a of the prior art filtering device shown in FIG. 19.

A container 110 has an inlet 111 for liquid to be treated, an outlet 112 for treated liquid and a drain port 114.

Let us assume that both the container a of the prior art filtering device and the container 110 have an inner diameter of 2 m and inner height of 2 m. The effective filtering surface area of the filtering material d of the prior art filtering device is $\pi r^2 = 3.14$ m$^2$. In contrast, in the container 110 of the present embodiment, 90 cylindrical assemblies 7 each having a diameter of 12.5 mm and height of 100 mm can be received in the container 110 with an interval of 50 mm between the respective screen assemblies. Since the effective filtering suface area of one screen assembly 7 is 0.125 m$\times \pi \times$1 m=0.4 m$^2$, the total effective filtering surface area of 90 screen assemblies 7 amounts to 0.4 m$^2 \times$90=36 m$^2$. Thus, more than ten times as large effective filtering surface area as the prior art filtering device is available from the filtering device according to the invention.

As the filter member constituting an element of the cylindrical screens of the screen assembly 7 in the above described embodiments, either of wedge wire, porous plate, wire-mesh, filter cloth and other screen elements can be employed. In case a wedge wire is used which is wound about the support rods in such a manner that slits of a predetermined width is formed between adjacent portions of the wedge wire, the cylindrical screen of the wedge-wire type having V-shaped slits are inherently resistant to blocking and, therefore, blocking of the slits of the screen and filtering materials can be prevented most efficiently and a prolonged continuous filtering operation of the filtering device can be achieved.

A module as shown in FIG. 16 and a larger module as shown in FIG. 17 may be formed also with the filtering devices shown in FIGS. 1, 6 and 9.

What is claimed is:

1. A filtering device comprising:
a container having an inlet for introducing liquid to be treated an outlet for treated liquid at a top end thereof, and a drain port for discharging reverse washing water at the lower end thereof, an annular screen assembly provided in the container and having an outlet for treated liquid connected to the outlet of the container, said annular screen assembly comprising three or more cylindrical screens having different diameters and being coaxially disposed in the container with their axes extending vertically in said container thereby forming an annular multi-layered screen assembly, an annulus being formed between respective adjacent cylindrical screens and two or more different granular filter materials, performing filtering functions which are different from each other, said granular filter materials being provided in each of the annuluses between the adjacent cylindrical screens, wherein each of the cylindrical screens of the annular screen assembly has a closed cylindrical wall portion extending from an upper end of the cylindrical screen to form an annular chamber between the respective adjacent cylindrical screens, said annular chamber being of a cylindrical shape and closed by a top plate in the form of a disk which is continuous to the annular chamber, each annulus being incompletely filled with the granular filter material so that free upward movement of the granular filter material within the annular chamber is permitted during reverse washing, thereby facilitating removal of impurities from the filter material, and wherein an outermost screen of said annular screen assembly is a wedge wire screen having a screen slit formed on the outside of the wedge wire screen and having an opening which widens radially inwardly from the screen slit.

2. A filtering device as defined in claim 1, wherein said container is provided with a plurality of said annular multi-layered screen assemblies containing granular filter materials in annuluses formed between said multi-layered screen assemblies provided in the container, said plurality of annular multi-layered screen assemblies having outlets and the outlets of said plurality of annular multi-layered screen assemblies being connected by a common outlet pipe connected to the outlet of the container.

3. A filtering device comprising a plurality of containers which contain a plurality of annular multi-layered screen assemblies as defined in claim 2, disposed in parallel with respect to each other and each container having a common outlet pipe, said common outlet pipe of said plurality of containers having the plurality of annular screen assemblies being connected with common connecting pipes to form a module.

4. A filtering device as defined in claim 1 wherein an innermost screen of said screen assembly comprises support rods extending in the axial direction of said innermost screen and arranged generally cylindrically with a predetermined interval, and a cylindrical filter member attached fixedly on the outside of the support rods, and said filtering device further comprises a vibrator including a shaft provided in a central portion of said innermost screen coaxially with said innermost screen and at least one leaf spring which is fixed in one end portion thereof to the shaft and is capable of abutting in the other end portion against a part of each of the support rods, and a drive unit for rotating at least one of the screen assembly and the vibrator.

5. A filtering device as defined in claim 1 wherein said outermost screen of said screen assembly comprises support rods extending in the axial direction of said outermost screen and arranged generally cylindrically with a predetermined interval, and a cylindrical filter member attached fixedly on the inside of the support rods, and said filtering device further comprises a vibrator including a frame provided on the outside of said outermost screen coaxially with the screen and extending in the axial direction of said outermost screen and at least one leaf spring which is fixed in one end portion thereof to the frame and is capable of abutting in the other end portion against a part of each of the support rods, and a drive unit for rotating at least one of the screen assembly and the vibrator.

6. A filtering device as defined in claim 1 further comprising flow creating means for creating, in said container, a flow of the liquid to be treated having a direction which is different from the direction of the flow of the liquid to be treated in the screen assembly.

7. A filtering device as defined in claim 1 and further comprising:
   a reverse washing tube provided coaxially in an innermost screen of said screen assembly, said reverse washing tube being rotatable about the axis of said innermost screen and having an inlet for the treated liquid in one end portion thereof and an opening for discharging the treated liquid and introducing reverse washing water in the other end portion thereof and having a plurality of reverse washing water injecting holes at a predetermined interval in the axial direction of the tube;
   a liquid transfer tube communicating with the opening for discharging the treated liquid and introducing reverse washing water;
   a check valve provided on the opening for discharging the treated liquid and introducing reverse washing water in the vicinity of the inlet for the treated liquid of said reverse washing tube for permitting flow of the treated liquid from said inlet into the reverse washing tube and prohibiting flow of the reverse washing water from inside of the reverse washing tube to said inlet; and
   means for rotating the reverse washing tube about its axis.

8. A filtering device comprising a plurality of filtering modules each of said plurality of filtering modules comprising a container having an inlet for introducing liquid to be treated, an outlet for treated liquid at a top end thereof, and a drain port for discharging reverse washing water at the lower end thereof, an annular screen assembly provided in the container and having an outlet for treated liquid connected to the outlet of the container, said annular screen assembly comprising three or more cylindrical screens having different diameters and being coaxially disposed in the container with their axes extending vertically in said container thereby forming an annular multi-layered screen assembly, an annulus being formed between respective adjacent cylindrical screens and two or more different granular filter materials, performing filtering functions which are different from each other, said granular filter materials being provided in each of the annuluses between the adjacent cylindrical screens, wherein each of the cylindrical screens of the annular screen assembly has a closed cylindrical wall portion extending from an upper end of the cylindrical screen to form an annular chamber between the respective adjacent cylindrical screens, said annular chamber being of a cylindrical shape and closed by a top plate in the form of a disk which is continuous to the annular chamber, each annulus being incompletely filled with the granular filter material so that free upward movement of the granular filter material within the annular chamber is permitted during reverse washing, thereby facilitating removal of impurities from the filter material, and wherein an outermost screen of said annular screen assembly is a wedge wire screen having a screen slit formed on the outside of the wedge wire screen and having an opening which widens radially inwardly from the screen slit, wherein said container further containing a plurality of said annular multi-layered screen assemblies and said screen assemblies having outlets, and the outlets of said screen assemblies being connected with a common outlet pipe connected to the outlet of the container, and common outlet pipes of each container of said plurality of filtering modules being connected with common connecting pipes to form the filtering device.

* * * * *